(12) United States Patent (10) Patent No.: US 12,436,998 B2
Schilders (45) Date of Patent: Oct. 7, 2025

(54) IN-SITU ONTOLOGY MAPPING IN OVERLAY SYSTEMS

(71) Applicant: INFOSYS LIMITED, Bangalore (IN)

(72) Inventor: Steven Schilders, Columbus, IN (US)

(73) Assignees: Infosys Limited, Bangalore (IN); InvertIT Inc., Columbus, IN (US)

( * ) Notice: Subject to any disclaimer, the term of this patent is extended or adjusted under 35 U.S.C. 154(b) by 62 days.

(21) Appl. No.: 18/585,554

(22) Filed: Feb. 23, 2024

(65) Prior Publication Data

US 2024/0289391 A1 Aug. 29, 2024

Related U.S. Application Data

(60) Provisional application No. 63/448,724, filed on Feb. 28, 2023, provisional application No. 63/448,711, filed on Feb. 28, 2023, provisional application No. 63/448,861, filed on Feb. 28, 2023, provisional application No. 63/448,738, filed on Feb. 28, 2023, provisional application No. 63/448,831, filed on Feb. 28, 2023.

(51) Int. Cl.
  *G06F 16/90* (2019.01)
  *G06F 16/901* (2019.01)
  *G06F 16/908* (2019.01)

(52) U.S. Cl.
  CPC ........ *G06F 16/9024* (2019.01); *G06F 16/908* (2019.01)

(58) Field of Classification Search
  CPC .......................... G06F 16/9024; G06F 16/908
  USPC ........................................................... 707/798
  See application file for complete search history.

(56) References Cited

U.S. PATENT DOCUMENTS

| | | | | |
|---|---|---|---|---|
| 7,930,160 B1 * | 4/2011 | Hosagrahara | ........... | G06F 30/00 703/13 |
| 8,595,702 B2 * | 11/2013 | Maybee | .............. | G06F 11/3636 717/133 |
| 8,878,852 B1 * | 11/2014 | Klein | .................... | H04L 41/065 345/440 |
| 10,706,434 B1 * | 7/2020 | Brainard | .............. | G09B 29/007 |
| 2002/0194154 A1 * | 12/2002 | Levy | ...................... | G16B 50/00 |
| 2003/0018616 A1 * | 1/2003 | Wilbanks | ................ | G06F 16/20 |

(Continued)

*Primary Examiner* — Hanh B Thai
(74) *Attorney, Agent, or Firm* — Finnegan, Henderson, Farabow, Garrett & Dunner, LLP

(57) ABSTRACT

An overlay system provided, includes processing circuitry and storage circuitry that stores primary executable graph-based models and auxiliary executable graph-based models. Each primary executable graph-based model is mapped to one or more auxiliary executable graph-based models based on various rules. The processing circuitry receives a stimulus associated with the overlay system and identifies, based on the stimulus, a primary executable graph-based model and one or more rules. Further, one or more values associated with an auxiliary executable graph-based model that is mapped to the primary executable graph-based model are retrieved based on the one or more rules. One or more values associated with the primary executable graph-based model are populated based on the retrieved one or more values. The processing circuitry further executes an operation associated with the stimulus based on the primary executable graph-based model that is populated with the one or more values.

20 Claims, 10 Drawing Sheets

(56) References Cited

U.S. PATENT DOCUMENTS

| | | | | |
|---|---|---|---|---|
| 2006/0288269 | A1* | 12/2006 | Oppenlander | G06F 40/174 707/999.1 |
| 2007/0016615 | A1* | 1/2007 | Mohan | G06F 8/20 |
| 2008/0109762 | A1* | 5/2008 | Hundal | G06F 16/38 707/E17.093 |
| 2009/0240662 | A1* | 9/2009 | Morgan | G06F 16/907 |
| 2013/0117326 | A1* | 5/2013 | De Smet | G06F 9/4488 707/798 |
| 2014/0019443 | A1* | 1/2014 | Golshan | G06F 16/9535 707/723 |
| 2014/0101601 | A1* | 4/2014 | Tang | G06F 16/29 715/781 |
| 2015/0052106 | A1* | 2/2015 | Barros | G06F 16/27 707/634 |
| 2015/0334045 | A1* | 11/2015 | Tremblay | H04L 41/40 709/226 |
| 2017/0286866 | A1* | 10/2017 | Bhowan | G06F 16/9024 |
| 2018/0074870 | A1* | 3/2018 | Park | G06F 16/278 |
| 2018/0341721 | A1* | 11/2018 | Xu | G06F 16/9024 |
| 2019/0066374 | A1* | 2/2019 | Santos | G06F 16/5854 |
| 2019/0130048 | A1* | 5/2019 | Egenolf | G06F 16/26 |
| 2020/0151608 | A1* | 5/2020 | Bhowan | G06F 16/9024 |
| 2020/0357001 | A1* | 11/2020 | Lopez Garcia | G06Q 30/018 |
| 2020/0387817 | A1* | 12/2020 | Kurtz | G06F 18/251 |
| 2021/0365457 | A1* | 11/2021 | Venema | G06F 16/248 |
| 2022/0043973 | A1* | 2/2022 | Arroyo | G06F 40/237 |
| 2022/0198296 | A1* | 6/2022 | Liu | H04L 67/52 |
| 2022/0353143 | A1* | 11/2022 | Hill | H04L 41/147 |
| 2023/0138372 | A1* | 5/2023 | Kreger-Stickles | H04L 63/164 709/220 |
| 2023/0152787 | A1* | 5/2023 | Ba | G05B 19/41865 700/108 |
| 2023/0162470 | A1* | 5/2023 | Garimella | G06V 10/764 382/103 |
| 2023/0164224 | A1* | 5/2023 | Adogla | H04L 67/141 709/227 |
| 2024/0202192 | A1* | 6/2024 | Liang | G06F 16/9024 |

* cited by examiner

IN-SITU ONTOLOGY MAPPING IN OVERLAY SYSTEMS

CROSS-REFERENCE TO RELATED APPLICATIONS/INCORPORATION BY REFERENCE

This patent application refers to, claims priority to, and claims the benefit of U.S. Provisional Application Ser. No. 63/448,738, filed Feb. 28, 2023; 63/448,724, filed Feb. 28, 2023; 63/448,831, filed Feb. 28, 2023; 63/448,711, filed Feb. 28, 2023; and 63/448,861, filed Feb. 28, 2023. Each of the above-referenced applications is hereby incorporated herein by reference in its entirety.

FIELD OF THE DISCLOSURE

Various embodiments of the present disclosure relate generally to overlay systems. More specifically, various embodiments of the present disclosure relate to in-situ ontology mapping in overlay systems.

BACKGROUND

Information technology has carved its space in various domains such as healthcare, finance, robotics, business, or the like. Both artificial intelligence and machine learning are integral components of information technology and improve the efficiency of operations associated therewith by digitizing and automating them. To keep-up with demands of domains that also implement various advanced and cutting-edge technologies, digitization and automation of the operations are required to perform at par with them. In many instances, the operations are to be performed in real-time, hence, the digitization and automation are also required to be performed in real-time. Such digitization and automation may include retrieval, transformation, and visualization of data that may be associated with different data sources implemented using different database schemas. Thus, there is a need to establish interoperability between different data sources.

In light of the foregoing, there exists a need for a technical and reliable solution that overcomes the abovementioned problems.

Limitations and disadvantages of conventional and traditional approaches will become apparent to one of skill in the art, through the comparison of described systems with some aspects of the present disclosure, as set forth in the remainder of the present application and with reference to the drawings.

SUMMARY

Methods and systems for facilitating in-situ ontology mapping in overlay systems are provided substantially as shown in, and described in connection with, at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the present disclosure are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

Figure 1:
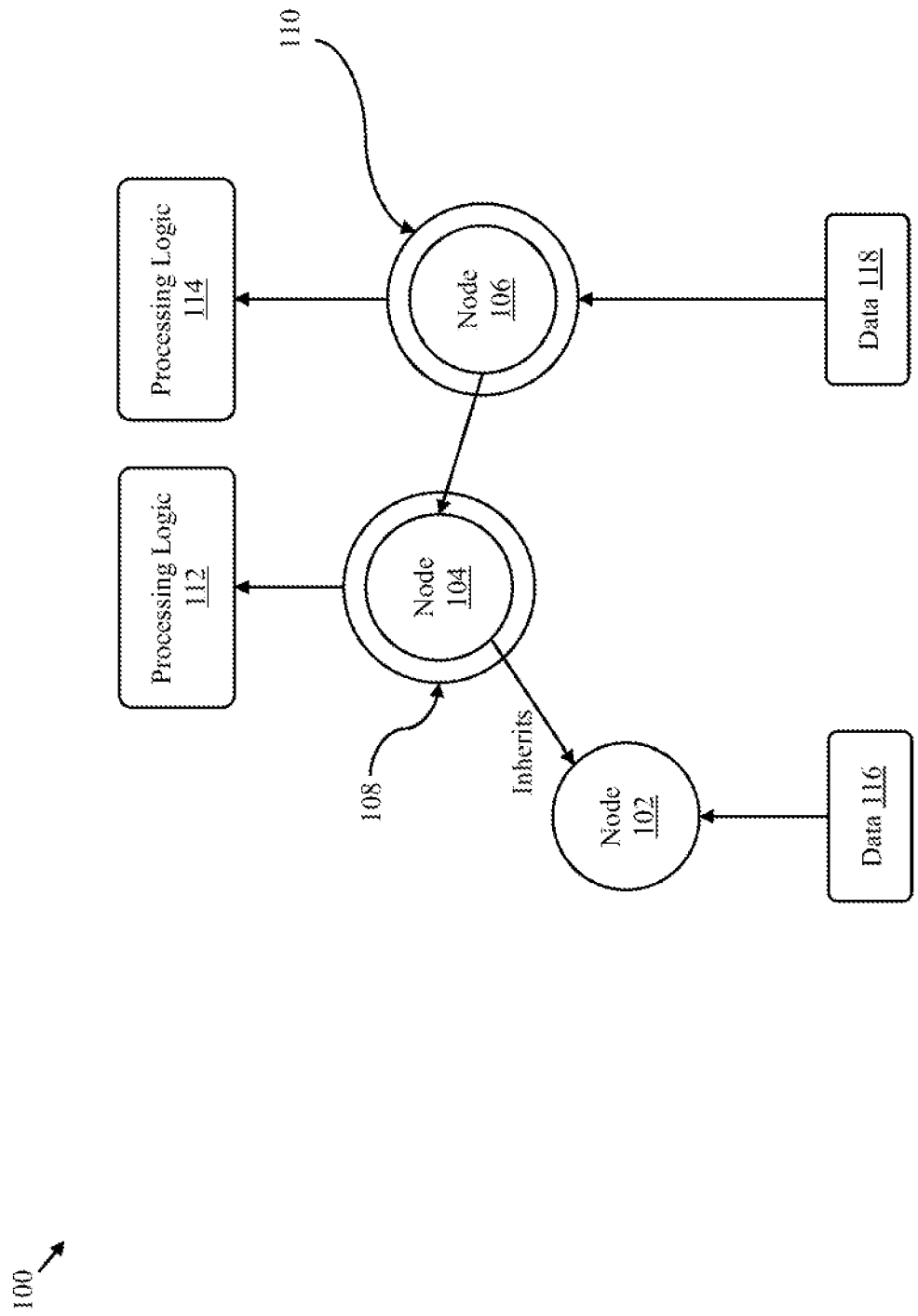
FIG. 1 is a graph that illustrates a composition of an executable graph-based model, in accordance with an embodiment of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview:

Traditionally, different data sources that are implemented using different database schemas (e.g., different ontologies) are mapped to each other to enable interoperability therebetween. A database schema or an ontology refers to a structural plan that defines organization and arrangement of data within a data source (such as a database). The database schema or the ontology represents logical and physical design of the data source, outlining data organization, handling of relationships between data, and constraints on the data. Therefore, a mapping between two or more data sources with unique ontologies is also referred to as an ontology mapping. Such mapping is performed using third-party mapper applications. However, the use of third-party mapper applications induces certain challenges. For example, the use of the mapper applications prohibits real-time mapping of data. Further, the data that is to be mapped is required to be provided to the mapper application. Hence, the data to be mapped gets duplicated and leads to inefficient use of storage resources. Also, the data to be mapped may be confidential and sensitive. Therefore, providing the data to the third-party mapper application makes the data compromised and vulnerable to security threats. Therefore, the use of third-party mapper applications is not only sub-optimal but also a compromise with data security. Additionally, the different data sources are stored in separate systems. Thus, the retrieval of required data based on the ontology mapping involves significant latencies that may prove to be fatal in areas such as healthcare. The increased latency may lead to undesirable outcomes during real-time operations.

The present disclosure is directed to the facilitation of in-situ ontology mapping in an overlay system. The overlay system includes storage circuitry that stores one or more primary executable graph-based models and one or more auxiliary executable graph-based models, with each executable graph-based model corresponding to a unique ontology. Each executable graph-based model is a customized hypergraph having hyper-edges that include one or more roles, and vertices that are realized by way of active nodes. Each active node is associated with a particular node type. For example, an edge node corresponds to an active node with an edge node type. Nodes (for example, active nodes) are connected with other nodes by way of edge nodes (e.g., roles included in the edge nodes). In some embodiments, roles are represented by way of nodes of role node type. Role node between two nodes may be indicative of details regarding an association therebetween. The executable graph-based model also includes a plurality of overlay nodes that facilitate in-situ ontology mapping in the overlay system. Each overlay node is associated with one or more nodes (for example, a vertex node, an edge node, or the like) of the executable graph-based model and includes a corresponding processing logic that when executed implements a functionality associated therewith on the associated nodes.

A primary executable graph-based model is mapped to an auxiliary executable graph-based model based on one or more mapper overlays to enable interoperability therebetween. The primary and auxiliary executable graph-based models mapped to each other include different datasets that correspond to a particular domain. Each mapper overlay node includes one or more rules based on which the corresponding primary executable graph-based model is mapped to the associated auxiliary executable graph-based model. Additionally, data retrieval based on ontology mapping and stimulus processing based on the retrieved data are executed in significantly less time.

In operation, processing circuitry of the overlay system may receive a stimulus that is indicative of the primary executable graph-based model. The processing circuitry identifies the one or more rules based on which the primary executable graph-based model is mapped to the auxiliary executable graph-based model. The primary executable graph-based model has one or more primary elements, whereas the auxiliary executable graph-based model has one or more auxiliary elements. Values associated with the primary elements are not persisted in the primary executable graph-based model, whereas values associated with the auxiliary elements are persisted in the auxiliary executable graph-based model. Thus, the values of the auxiliary elements are extracted from the auxiliary executable graph-based model based on the one or more rules. The values of the primary elements are populated in the primary executable graph-based model based on the retrieved auxiliary values and the one or more rules. Upon the population of the primary values, an operation associated with the stimulus is executed based on the primary executable graph-based model that is populated with the primary values.

Traditional approach of ontology mapping involves mapping between the ontologies that are stored in separate systems by the third-party mapper applications. Such an approach prohibits real-time mapping of data. Further, as the data that is to be mapped is provided to the mapper applications, the data to be mapped gets duplicated and leads to inefficient use of storage resources. Additionally, the data accessible to the third-party mapper applications makes the data compromised and vulnerable to security threats. Also, the retrieval of the required data based on the ontology mapping involves significant latency. In contrast, the present disclosure provides in-situ ontology mapping, thereby eliminating the requirement of the third-party mapper applications, thus enabling real-time mapping of data in the overlay system which stores multiple primary executable graph-based models and auxiliary executable graph-based models. As the mapping is in-situ, the duplication of data is prevented, thus leading to efficient use of storage resources. Additionally, the primary and auxiliary executable graph-based models are secured from security threats as they are not exposed to any third-party mapper applications. Also, ontology mapping between primary and auxiliary executable graph-based models and retrieval of the required data based on the ontology mapping involves significantly reduced latency.

In the present disclosure, systems and methods for facilitating in-situ ontology mapping in overlay systems are provided. As the ontology mapping is in-situ, utilization of ontology mapping exhibits significantly reduced latency. Additionally, time complexity associated with stimulus processing is also reduced. The reduction in time complexity associated with the in-situ ontology mapping is beneficial in various applications (e.g., healthcare, finance, robotics, or the like) that involve crucial operations based on the ontology mapping. Additionally, in-situ ontology mapping enables efficient resource utilization and improved security. Further, the disclosed systems and methods do not require the data and processing logic to be available at all times, and hence, the data and processing logic when not in use may be stored separately and re-loaded in the corresponding executable run-time node when needed. Thus, the systems and methods disclosed herein provide an efficient approach for in-situ ontology mapping in the executable graph-based models in a secured and seamless manner.

Figure Description

FIG. 1 is a graph that illustrates a composition of an executable graph-based model 100, in accordance with an embodiment of the present disclosure. Referring to FIG. 1, the executable graph-based model 100 is generally formed of a data structure (e.g., a graph-based model or a graphical model) comprising a plurality of nodes 102-106 which can be functionally extended with processing logic via the use of overlays. For example, as shown in FIG. 1, the nodes 104 and 106 are functionally extended with processing logic via the use of overlays 108 and 110, respectively. Although not shown, it will be apparent to a person skilled in the art that the node 102 can be similarly extended with processing logic via the use of one or more overlays. Each overlay includes processing logic, such as processing logic 112 and 114 which are associated with the overlays 108 and 110, respectively. At run-time, data, such as data 116 and 118, is associated with the nodes 102 and 106, respectively, of the executable graph-based model 100. Further, the overlays 108 and 110 of the nodes 104 and 106, respectively, provide the functionality to respond to stimuli and interact with, manipulate, or otherwise process the data for facilitating in-situ ontology mapping based on the stimuli. Further, the node 104 inherits the node 102, and hence, also inherits the data 116 which is associated with the node 102. In some embodiments, the node 102 may be extended to have one or more overlays. In such embodiments, the node 104 may further inherit the overlays of the node 102.

Each element within the executable graph-based model 100 (both the data and the processing functionality) is a node. A node forms the fundamental building block of all executable graph-based models. A node may be an executable run-time node. A node extended by way of an overlay node forms an executable run-time node. One or more nodes are extended to include overlays in order to form the executable graph-based models. As such, the executable graph-based model 100 includes one or more nodes that can be dynamically generated, extended, or processed by one or more other modules within an overlay system (shown in FIG. 2).

As such, the structure and functionality of the data processing are separate from the data itself when offline (or at rest) and are combined dynamically at run-time. The executable graph-based model 100 thus maintains the separability of the data and the processing logic when offline. Moreover, by integrating the data and the processing logic within a single model, processing delays or latencies are reduced because the data and the processing logic exist within the same logical system. Therefore, the executable graph-based model 100 is applicable to a range of time-critical systems where efficient processing of the stimuli is required. In an instance, the executable graph-based model 100 may be used for in-situ processing of stimuli such as a command, a query, or the like.

Figure 2:
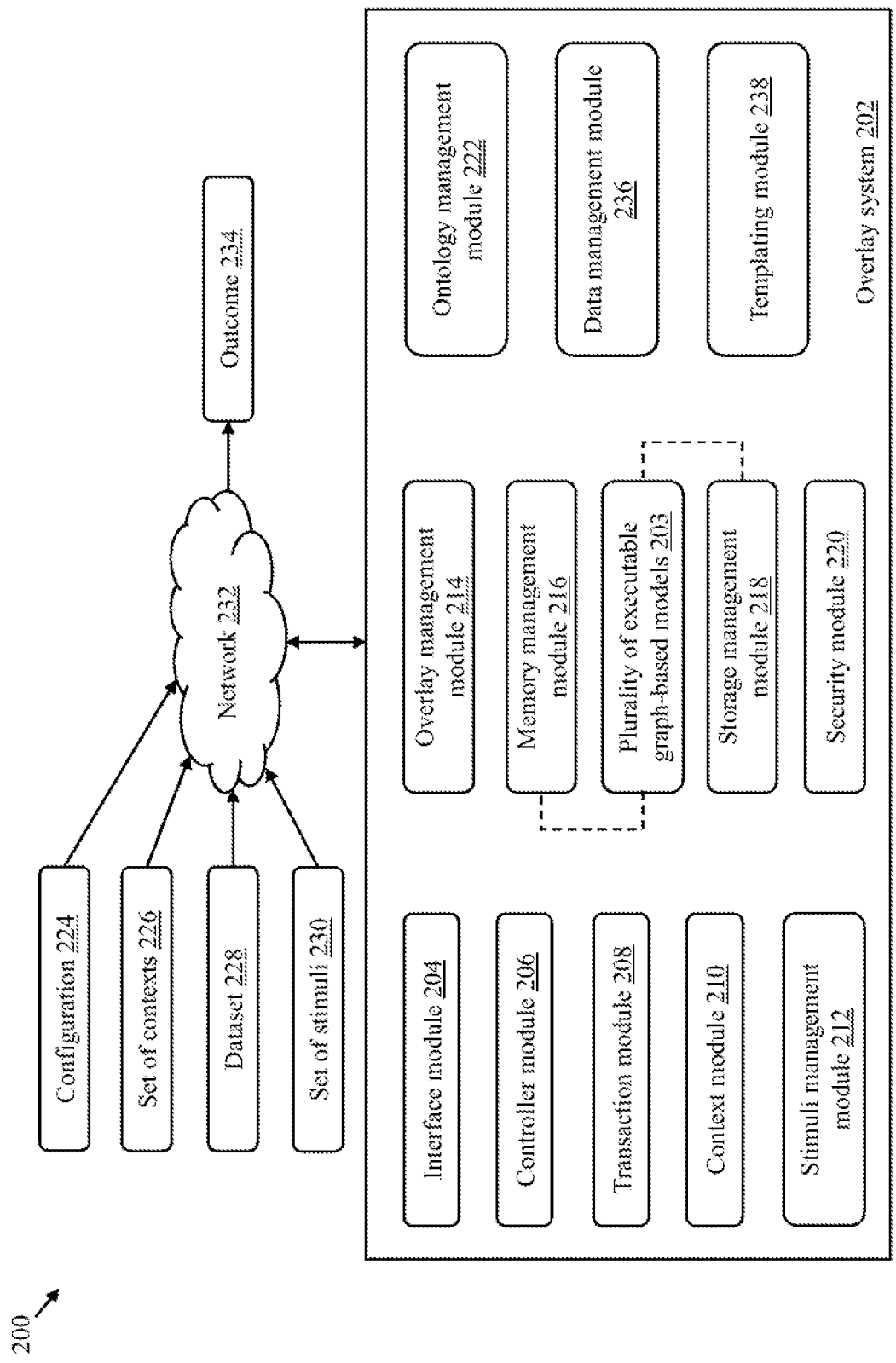
FIG. 2 is a block diagram that illustrates a system environment of an overlay system for execution, management, and configuration of executable graph-based models, in accordance with an embodiment of the present disclosure.

FIG. 2 is a block diagram that illustrates a system environment 200 of an overlay system 202 for execution, management, and configuration of executable graph-based models, in accordance with an embodiment of the present disclosure. Referring to FIG. 2, the overlay system 202 includes a plurality of executable graph-based models 203. The plurality of executable graph-based models 203 may include the executable graph-based 100. Each executable graph-based model, of the plurality of executable graph-based models 203, corresponds to a unique ontology. A composition of each executable graph-based model, of the plurality of executable graph-based models 203, is similar to the composition of the executable graph-based model 100 illustrated in FIG. 1. The overlay system 202 further includes an interface module 204, a controller module 206, a transaction module 208, a context module 210, a stimuli management module 212, an overlay management module 214, a memory management module 216, a storage management module 218, a security module 220, and an ontology management module 222. FIG. 2 further shows a configuration 224, a set of contexts 226, a dataset 228, a set of stimuli 230, a network 232, and an outcome 234.

The overlay system 202 may include suitable logic, circuitry, interfaces, and/or code, executable by the circuitry, that may be configured to facilitate in-situ ontology mapping in overlay systems (such as the overlay system 202). In the overlay systems, the ontology mapping is performed between two or more executable graph-based models. The ontology mapping between the two or more executable graph-based models enables interoperability therebetween. Each executable graph-based model, of the plurality of executable graph-based models 203, corresponds to an application-specific combination of data and processing functionality which is manipulated, processed, and/or otherwise handled by other modules within the overlay system 202 for creation and utilization of ontology mapping therein based on the set of stimuli 230 received by the overlay system 202. Each stimulus in the set of stimuli 230 corresponds to a command or a query.

The interface module 204 may include suitable logic, circuitry, interfaces, and/or code, executable by the circuitry, configured to provide a common interface between internal modules of the overlay system 202 and/or external sources. The interface module 204 provides an application programmable interface (API), scripting interface, or any other suitable mechanism for interfacing externally or internally with any module of the overlay system 202. As shown in FIG. 1, the configuration 224, the set of contexts 226, the dataset 228, and the set of stimuli 230 are received by the interface module 204 via the network 232. Similarly, outputs produced by the overlay system 202, such as the outcome 234, are passed by the interface module 204 to the network 232 for consumption or processing by external systems. In one embodiment, the interface module 204 supports one or more messaging patterns or protocols such as the simple object access protocol (SOAP), the representational state transfer (REST) protocol, or the like. The interface module 204 thus allows the overlay system 202 to be deployed in any number of application areas, operational environments, or architecture deployments. Although not illustrated in FIG. 1, the interface module 204 is communicatively coupled (e.g., connected either directly or indirectly) to one or more other modules or elements within the overlay system 202 (such as the controller module 206, the context module 210, the plurality of executable graph-based models 203, or the like). In one embodiment, the interface module 204 is communicatively coupled (e.g., connected either directly or indirectly) to one or more overlays within each of the plurality of the executable graph-based models 203.

The controller module 206 may include suitable logic, circuitry, interfaces, and/or code, executable by the circuitry, configured to handle and process interactions and executions within the overlay system 202. As will be described in more detail below, stimuli (such as the set of stimuli 230) and their associated contexts provide the basis for all interactions within and between each executable graph-based model of the plurality of executable graph-based models 203. Processing of such stimuli may lead to the execution of processing logic associated with one or more overlays within each executable graph-based model of the plurality of executable graph-based models 203. The processing of the stimuli within the overlay system 202 may be referred to as a system transaction. The processing and execution of stimuli (and associated overlay execution) within the overlay system 202 is handled by the controller module 206. The controller module 206 manages all received input stimuli and processes them based on a corresponding context. Each context determines the priority that is assigned to process the corresponding stimulus by the controller module 206 or the context module 210. This allows each stimulus to be configured with a level of importance and prioritization within the overlay system 202.

The controller module 206 may maintain the integrity of the modules within the overlay system 202 before, during, and after a system transaction. The transaction module 208, which is associated with the controller module 206, is responsible for maintaining the integrity of the overlay system 202 through the lifecycle of a transaction. Maintaining system integrity via the controller module 206 and the transaction module 208 allows a transaction to be rolled back in the event of an expected or unexpected software or hardware fault or failure. The controller module 206 is configured to handle the processing of the set of stimuli and transactions through architectures such as parallel processing, grid computing, priority queue techniques, or the like. In one embodiment, the controller module 206 and the transaction module 208 are communicatively coupled (e.g., connected either directly or indirectly) to one or more overlays within each of the plurality of the executable graph-based models 203.

As stated briefly above, the overlay system 202 utilizes a context-driven architecture whereby the set of stimuli 230 within the overlay system 202 is associated with the set of contexts 226 which is used to adapt the handling or processing of the set of stimuli 230 by the overlay system 202. The handling or processing of the set of stimuli 230 is done based on the set of contexts 226 associated therewith. Hence, each stimulus of the set of stimuli 230 is considered to be a contextualized stimulus. Each context of the set of contexts 226 may include details such as user name, password, access token, device information, time stamp, one or more relevant identifiers (IDs), or the like, that are required for processing of a corresponding stimulus of the set of stimuli 230 in the overlay system 202. Each context within the overlay system 202 may be extended to include additional information that is required for the processing of the corresponding stimulus (e.g., a query or a command).

The context module 210 may include suitable logic, circuitry, interfaces, and/or code, executable by the circuitry, configured to manage the handling of contexts within the overlay system 202, and is responsible for processing any received contexts (e.g., the set of contexts 226) and translating the received context to an operation execution context. In some examples, the operation execution context is larger than the received context because the context module 210 supplements the received context with further information necessary for the processing of the received context. The context module 210 passes the operational execution context to one or more other modules within the overlay system 202 to facilitate in-situ ontology mapping in the overlay system 202. Contexts within the overlay system 202 can be external or internal. While some contexts apply to all application areas and problem spaces, some applications may require specific contexts to be generated and used to process the received set of stimuli 230. As will be described in more detail below, each executable graph-based model, of the plurality of executable graph-based models 203, is configurable (e.g., via the configuration 224) so as only to execute within a given execution context for a given stimulus.

The stimuli management module 212 may include suitable logic, circuitry, interfaces, and/or code, executable by the circuitry, configured to process externally received stimuli (e.g., the set of stimuli 230) and any stimuli generated internally from any module within the overlay system 202. The stimuli management module 212 is communicatively coupled (e.g., connected either directly or indirectly) to one or more overlays within each of the plurality of executable graph-based models 203 to facilitate the processing of stimuli within the overlay system 202. The overlay system 202 utilizes different types of stimuli such as a command (e.g., a transactional request) or a query received from an external system such as an Internet-of-Things (IoT) device. As previously stated, each stimulus of the set of stimuli 230 can be either externally or internally generated. In an example, each stimulus of the set of stimuli 230 may be a message that is internally triggered (generated) from any of the modules within the overlay system 202. Such internal generation of the set of stimuli 230 indicates that something has happened within the overlay system 202 such that subsequent handling by one or more other modules within the overlay system 202 may be required. An internal set of stimuli 230 can also be triggered (e.g., generated) from the execution of processing logic associated with overlays within an executable graph-based model of the plurality of executable graph-based models 203. In another example, the set of stimuli 230 may be externally triggered and may be generated based on an input received via a user interface associated with the controller module 206. The externally triggered set of stimuli 230 may be received in the form of a textual, audio, or visual input. The externally triggered set of stimuli 230 may be associated with the intent of a user to execute a set of operations indicated by the set of stimuli 230. The operation is executed in accordance with the information included in the set of contexts 226 associated with the set of stimuli 230.

The stimuli management module 212 may receive the stimuli in real-time or near-real-time and communicate the received set of stimuli 230 to one or more other modules or nodes of the plurality of executable graph-based models 203. In some examples, the stimuli are scheduled in a batch process. The stimuli management module 212 utilizes any suitable synchronous or asynchronous communication architectures or approaches in communicating the stimuli (along with associated information). The stimuli within the overlay system 202 are received and processed (along with a corresponding context) by the stimuli management module 212, which then determines the processing steps to be performed for the execution of an operation associated with each stimulus of the set of stimuli 230. In one embodiment, the stimuli management module 212 processes the received stimuli in accordance with a predetermined configuration (e.g., the configuration 224) or dynamically determines what processing needs to be performed based on the contexts associated with the stimuli and/or based on a state of the corresponding executable graph-based model. The state of the executable graph-based model refers to the current state of each node of the executable graph-based model at a given point in time. The state of each executable graph-based model is dynamic, and hence, may change in response to the execution of an operation based on any of its nodes. In some examples, the processing of each stimulus of the set of stimuli 230 results in the creation of ontology mapping or utilization of ontology mapping, which further results in one or more outcomes being generated (e.g., the outcome 234). Such outcomes are either handled internally by one or more modules in the overlay system 202 or communicated via the interface module 204 as an external outcome. In one embodiment, all stimuli and corresponding outcomes are recorded for auditing and post-processing purposes by, for example, an operations module (not shown) and/or an analytics module (not shown) of the overlay system 202.

The overlay management module 214 may include suitable logic, circuitry, interfaces, and/or code, executable by the circuitry, configured to manage all overlays within the overlay system 202. Operations performed by the overlay management module 214 include overlay storage management, overlay structure modeling, overlay logic creation and execution, and overlay loading and unloading (within one or more of the plurality of executable graph-based models 203). The overlay management module 214 is communicatively coupled (e.g., connected either directly or indirectly) to one or more other modules within the overlay system 202 to complete some or all of these operations. For example, overlays can be persisted in some form of physical storage using the storage management module 218 (as described in more detail below). As a further example, overlays can be compiled and preloaded into memory via the memory management module 216 for faster run-time execution.

The memory management module 216 may include suitable logic, circuitry, interfaces, and/or code, executable by the circuitry, configured to manage and optimize the memory usage of the overlay system 202. The memory management module 216 thus helps to improve the responsiveness and efficiency of the processing performed by one or more modules within the overlay system 202 by optimizing the memory handling performed by these modules. The memory management module 216 uses direct memory or some form of distributed memory management architecture (e.g., a local or remote caching solution). Additionally, or alternatively, the memory management module 216 deploys multiple different types of memory management architectures and solutions (e.g., reactive caching approaches such as lazy loading or a proactive approach such as write-through cache may be employed). These architectures and solutions are deployed in the form of a flat (single-tiered) cache or a multi-tiered caching architecture where each layer of the caching architecture can be implemented using a different caching technology or architecture solution approach. In such implementations, each cache or caching tier can be configured (e.g., by the configuration 224) independently of the requirements for one or more modules of the overlay system 202. For example, data priority and an eviction strategy, such as least-frequently-used (LFU) or least-recently-used (LRU), can be configured for all or parts of one or more executable graph-based models of the plurality of executable graph-based models 203. In one embodiment, the memory management module 216 is communicatively coupled (e.g., connected either directly or indirectly) to one or more overlays within each of the plurality of executable graph-based models 203.

The storage management module 218 may include suitable logic, circuitry, interfaces, and/or code, executable by the circuitry, configured to manage the temporary or permanent storage of data associated with implementing in-situ ontology mapping within the overlay system 202. The storage management module 218 is any suitable low-level storage device solution (such as a file system) or any suitable high-level storage technology such as another database technology (e.g., a relational database management system (RDBMS) or a NoSQL database). The storage management module 218 is directly connected to the storage device upon which the relevant data is persistently stored. For example, the storage management module 218 can directly address the computer-readable medium (e.g., hard disk drive, external disk drive, or the like) upon which the data is being read or written. Alternatively, the storage management module 218 is connected to the storage device via a network, such as the network 232. As will be described in more detail later in the present disclosure, the storage management module 218 uses 'manifests' to manage the interactions between the storage device and the modules within the overlay system 202. In one embodiment, the storage management module 218 is communicatively coupled (e.g., connected either directly or indirectly) to one or more overlays within each of the plurality of executable graph-based models 203.

As described, storage, loading, and unloading of the one or more of the plurality of executable graph-based models 203 or one or more components thereof may be facilitated by the memory management module 216 and the storage management module 218. The memory management module 216 and the storage management module 218 may facilitate such operations by interacting with the storage device. In the present disclosure, the plurality of executable graph-based models 203 may be stored in storage circuitry. The storage circuitry corresponds to a combination of the memory management module 216 and the storage management module 218. In some embodiments, the storage circuitry may be a storage module that is managed by the memory management module 216 and the storage management module 218, collectively. In some embodiments, the storage circuitry may include a plurality of storage elements such that each executable graph-based model of the plurality of executable graph-based models 203 is stored in a corresponding storage element of the plurality of storage elements. Further, each storage element of the plurality of storage elements may be associated with a unique computer system. That is to say, each storage element of the plurality of storage elements may be distributed across multiple systems.

The security module 220 may include suitable logic, circuitry, interfaces, and/or code, executable by the circuitry, configured to manage the security of the overlay system 202. This includes security at a system level and a module level. Security is hardware-related, network-related, or software-related, depending on the operational environment, the architecture of the deployment, or the data and information contained within the overlay system 202. For example, if the system is deployed with a web-accessible API (as described above in relation to the interface module 204), the security module 220 can enforce a hypertext transfer protocol secure (HTTPS) protocol with the necessary certification. As a further example, if the data or information associated with the message received or processed by the overlay system 202 contains Personally Identifiable Information (PII) or Protected Health Information (PHI), the security module 220 can implement one or more layers of data protection to ensure that the PII or PHI is correctly processed and stored. In an additional example, in implementations where the overlay system 202 operates on United States of America citizen medical data, the security module 220 may enforce additional protections or policies as defined by the United States Health Insurance Portability and Accountability Act (HIPAA). Similarly, if the overlay system 202 is deployed in the European Union (EU), the security module 220 may enforce additional protections or policies to ensure that the data processed and maintained by the overlay system 202 complies with the General Data Protection Regulation (GDPR). In one embodiment, the security module 220 is communicatively coupled (e.g., connected either directly or indirectly) to one or more overlays within each of the plurality of executable graph-based models 203, thereby directly connecting security execution to the data/information in the plurality of executable graph-based models 203.

The ontology management module 222 may include suitable logic, circuitry, interfaces, and/or code, executable by the circuitry, configured to facilitate in-situ ontology mapping in the overlay system 202. Operations performed by the ontology management module 222 may include the creation and/or modification of the mapping between two or more of the plurality of executable graph-based models 203. The ontology management module 222 is communicatively coupled (e.g., connected either directly or indirectly) to one or more other modules within the overlay system 202 to complete some or all of these operations. The ontology management module 222 is further communicatively coupled (i.e., connected either directly or indirectly) to one or more nodes and/or one or more overlays within each of the plurality of executable graph-based models 203.

In addition to the abovementioned components, the overlay system 202 further includes a data management module 236. The data management module 236 may include suitable logic, circuitry, interfaces, and/or code, executable by the circuitry, configured to manage all data or information (e.g., the dataset 228) within the overlay system 202 for a given application. Operations performed by the data management module 236 include data loading, data unloading, data modeling, and data processing. The data management module 236 is communicatively coupled (e.g., connected either directly or indirectly) to one or more other modules within the overlay system 202 to complete some or all of these operations. For example, data storage is handled by the data management module 236 in conjunction with the storage management module 218.

In one embodiment of the present disclosure, the overlay system 202 may further include a templating module 238. The templating module 238 may include suitable logic, circuitry, interfaces, and/or code, executable by the circuitry, configured to implement a templated version of each of the plurality of executable graph-based models 203. The templating module 238 may be further configured to generate specific instances of nodes from predefined templates for the implementation of the templated version of each executable graph-based model. In other words, the templating module 238 ensures ontology integrity by enforcing the structure and rules of a template when generating instances of the template at run-time.

For the sake of brevity, the present invention is described with reference to the templated version of each of the plurality of executable graph-based models 203. In-situ ontology mapping in the overlay system 202 that includes templated versions of the plurality of executable graph-based models 203 is described in conjunction with FIG. 6. However, the scope of the present disclosure is not limited to in-situ ontology mapping in the overlay system 202 that includes templated versions of the plurality of executable graph-based models 203. In other embodiments, in-situ ontology mapping may be facilitated in the overlay system 202 that includes non-templated versions of the plurality of executable graph-based models 203, without deviating from the scope of the present disclosure.

In some embodiments, all the modules of the overlay system 202 except for the plurality of executable graph-based models 203 may collectively form processing circuitry that executes operations associated with the in-situ ontology mapping in the overlay system 202.

The functionality of two or more of the modules included in the overlay system 202 may be combined within a single module. Conversely, the functionality of a single module can be split into two or more further modules which can be executed on two or more devices. The modules described above in relation to the overlay system 202 can operate in a parallel, distributed, or networked fashion. The overlay system 202 may be implemented in software, hardware, or a combination of both software and hardware. Examples of suitable hardware modules include a general-purpose processor, a field programmable gate array (FPGA), and/or an application-specific integrated circuit (ASIC). Software modules can be expressed in a variety of software languages such as C, C++, Java, Ruby, Visual Basic, Python, and/or other object-oriented, procedural, or programming languages.

Having described the overlay system 202 for executing and managing executable graph-based models, the description will now turn to the elements of an executable graph-based model; specifically, the concept of a node. Unlike conventional graph-based systems, all elements (e.g., data, overlays, etc.) within the executable graph-based model (e.g., the plurality of executable graph-based models 203) are implemented as nodes. As will become clear, this allows executable graph-based models to be flexible, extensible, and highly configurable.

Figure 3:
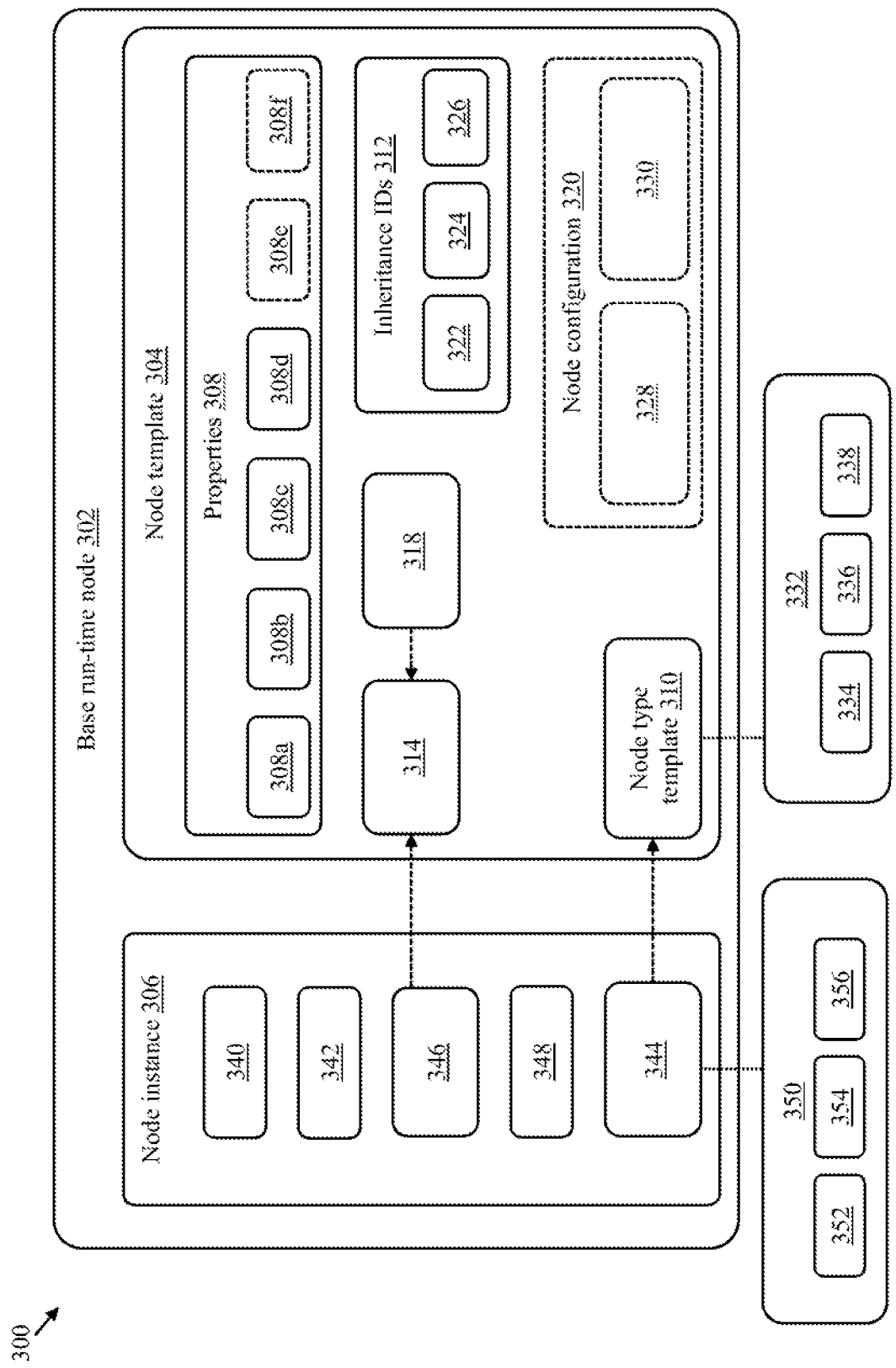
FIG. 3 is a block diagram that illustrates a generic structure of a base run-time node within the executable graph-based model, in accordance with an embodiment of the present disclosure.

FIG. 3 is a block diagram 300 that illustrates a generic structure of a base run-time node 302 within the executable graph-based model 100, in accordance with an embodiment of the present disclosure. The base run-time nodes within other executable graph-based models of the plurality of executable graph-based models 203 may be similar to the base run-time node 302. Referring to FIG. 3, the base run-time node 302 corresponds to the core structure of the executable graph-based model 100 and forms the foundational building block for all data and processing logic within the executable graph-based model 100. The base run-time node 302 is shown to include a node template 304 and a node instance 306. The node instance 306 is generated according to the node template 304. The base run-time node 302 shown in FIG. 3 is a compositional structure that is generated and executed, at run-time as part of the executable graph-based model 100. In other words, the node template 304 is defined 'offline' and the node instance 306 and the base run-time node 302 are run-time structures that are dynamically generated during execution of the executable graph-based model 100.

The node template 304 comprises a predetermined node structure. Further, the node template 304 defines one or more rules that govern the generation of the node instance 306. The node instance 306 is an implementation of the node template 304. In other words, the node instance 306 is generated based on the predetermined node structure and the one or more rules of the node template 304. The node template 304 cannot be modified during the execution but may be modified during offline mode or at rest. During execution, only the node instance 306 of the base run-time node 302 may be modified.

The node template 304 includes properties 308, a node type template 310, inheritance IDs 312, and a set of attribute templates 314. The node template 304 may optionally include metadata 318 and a node configuration 320. The properties 308 of the node template 304 include a unique ID 308a, a version ID 308b, a namespace 308c, a name 308d, and optionally include one or more icons 308e and a set of labels 308f. The inheritance IDs 312 comprise an abstract flag 322, a leaf flag 324, and a root flag 326. The node configuration 320 optionally comprises one or more node configuration strategies 328 and/or one or more node configuration extensions 330. FIG. 3 further shows a plurality of predetermined node type templates 332. The plurality of predetermined node type templates 332 include a vertex node type template 334, an edge node type template 336, and an overlay node type template 338. Further, the node instance 306 includes a unique ID 340, a version ID 342, a node type instance 344, and a set of attribute instances 346. The node instance 306 may optionally include metadata 348. FIG. 3 further shows a plurality of predetermined node type instances 350. The plurality of predetermined node type instances 350 include a vertex node type instance 352, an edge node type instance 354, and an overlay node type instance 356.

The unique ID 308a is unique for each node template within the executable graph-based model 100. Similarly, the unique ID 340 is unique for each node instance within the executable graph-based model 100. The unique ID 308a and the unique ID 340 are used to register, manage, and reference the node template 304 and the node instance 306, respectively, within the overlay system 202. The version ID 308b of the node template 304 is incremented when the node template 304 undergoes transactional change. Similarly, the version ID 342 of the node instance 306 is incremented when the node instance 306 undergoes transactional change. The namespace 308c of the node template 304, along with the name 308d of the node template 304, is used to help organize node templates within the executable graph-based model 100. That is, the node template 304 is assigned a unique name 308d within the namespace 308c such that the name 308d of the node template 304 need not be unique within the entire executable graph-based model 100, only within the context of the namespace 308c to which the node template 304 is assigned. The node template 304 optionally comprises one or more icons 308e which are used to provide a visual representation of the node template 304. The one or more icons 308e can include icons at different resolutions and display contexts such that the visualization of the node is adapted to different display settings and contexts. The node template 304 also optionally comprises the set of labels 308f which are used to override the name 308d when the node template 304 is rendered or visualized.

The node template 304 supports the software development feature of multiple inheritances by maintaining references (not shown) to zero or more other node templates, which then act as the base of the node template 304. This allows the behavior and functionality of a node template to be extended or derived from one or more other node templates within an executable graph-based model. The node instance 306 likewise supports multiple inheritance because it is an instance representation of the node template 304. The multiple inheritance structure of the node instance 306 is, however, limited to the corresponding instance realization of the multiple inheritance structure defined by the node template 304, i.e., one node instance 306 is created and managed for each node template 304 defined in the inheritance hierarchy for a node instance of a node template.

The inheritance IDs 312 of the node template 304 provide an indication of the inheritance-based information, which is applicable, or can be applicable, to the node template 304. The inheritance IDs 312 comprise a set of Boolean flags that identify the inheritance structure of the node template 304. The abstract flag 322 of the inheritance IDs 312 allows the node template 304 to support the construct of abstraction. When the abstract flag 322 takes a value of 'true', the node template 304 is flagged as abstract meaning that it cannot be instantiated or created within an executable graph-based model. Thus, a node template having the abstract flag 322 set to 'true' can only form the foundation of another node template that inherits from it. By default, the abstract flag 322 of a node template is set to 'false'. The leaf flag 324 of the inheritance IDs 312 is used to indicate whether any other node template can inherit from the node template 304. If the leaf flag 324 is set to 'true', then no other node template can inherit from the node template 304 (but unlike an abstract node, a node template with a leaf flag set can still be instantiated and created within an executable graph-based model). The root flag 326 of the inheritance IDs 312 is used to indicate whether the node template 304 inherits from any other node template. If the root flag 326 is set to 'true', then the node template 304 does not inherit from any other node template. The node template 304 is flagged as leaf (i.e., the leaf flag 324 is set to 'true') and/or root (i.e., the root flag 326 is set to 'true'), or neither (i.e., both the leaf flag 324 and the root flag 326 are set to 'false'). It will be apparent to the person skilled in the art that a node template cannot be flagged as both abstract and leaf (i.e., the abstract flag 322 cannot be set to 'true' whilst the leaf flag 324 is set to 'true').

All elements within the executable graph-based model 100 are defined as node templates or node instances. The functionality of the node template 304 and the node instance 306 are realized due to the use of the node type template 310 and the node type instance 344. The node type template 310 of the node template 304 is used to extend the functionality of the node template 304 by defining the standard set of capabilities, including data and associated behavior. The vertex node type template 334 (also referred to as a data node type template) includes a template of common data structures and functionality related to the 'things' modeled in the graph (e.g., the data). The vertex node instance 352 includes the common data structures and functionality related to the 'things' modeled in the graph based on the vertex node type template 334. The edge node type template 336 includes a template of common data structures and functionality related to joining two or more nodes. A node instance having the edge node type instance 354 may connect two or more nodes and thus the edge node type instance 354 constructs associations and connections between nodes (for example, objects or 'things') within the executable graph-based model 100. The edge node type instance 354 is not restricted to the number of nodes that can be associated or connected by a node having the edge node type instance 354. The data structures and functionality of the edge node type instance 354 thus define a hyper-edge which allows two or more nodes to be connected through a defined set of roles. A role defines a connective relationship between the two or more nodes, and hence, allows an edge node to connect two or more nodes such that the two or more nodes may have more than one relationship therebetween. The plurality of predetermined node type templates 332 further includes the overlay node type template 338. The overlay node type template 338 is used to extend the functionality of a node template (e.g., the node template 304) to incorporate processing logic. Similarly, the overlay node type instance 356 is used to extend the functionality of a node instance (e.g., the node instance 306) to incorporate processing logic.

The set of attribute templates 314 corresponds to the data defined by the node template 304. For example, the set of attribute templates 314 may define the names and value types (e.g., integer, string, float, etc.) of one or more attributes but not the values of these attributes. The values of the set of attribute templates 314 may be defined by the set of attribute instances 346 of the node instance 306 through one or more values or instance values. For example, the node template 304 may define a string attribute 'surname' and the corresponding node instance 306 may assign the instance value 'Bell-Richards' to this string attribute. Each attribute instance of the set of attribute instances 346 is associated with an attribute template of the set of attribute templates 314. The node template 304 may define one or more default values for the set of attribute templates 314. The default values correspond to the values that the attributes take if no value is assigned. The metadata 318 (e.g., data stored as a name, value type, and value triplet) is associated with either the node template 304 or one or more of the set of attribute templates 314 of the node template 304. Similarly, the node instance 306 also optionally comprises the metadata 348 (e.g., data stored as a name, value type, and value triplet) which is associated with either the node instance 306 or one or more of the set of attribute instances 346.

The node configuration 320 provides a high degree of configurability for the different elements of a node template and/or a node instance. An example of a concrete node configuration strategy is an ID strategy, associated with the configuration of the unique ID 308*a* of the node template 304. A further example of a concrete node configuration strategy is a versioning strategy, associated with the configuration of the version ID 308*b* of the node template 304 which supports major and minor versioning (depending on the type of transactional change incurred). The versioning strategy may be adapted to a native filing system of a user device hosting the overlay system 202 or a third-party data storage (for example, Snowflake®, or the like) associated with the overlay system 202.

Although it is provided that the node template 304 is associated with the node instance 306, the scope of the present disclosure is not limited to it. In other embodiments, the node template 304 may be further associated with two or more node instances where the two or more node instances correspond to two or more implementations of the node template 304, respectively.

Figure 4:
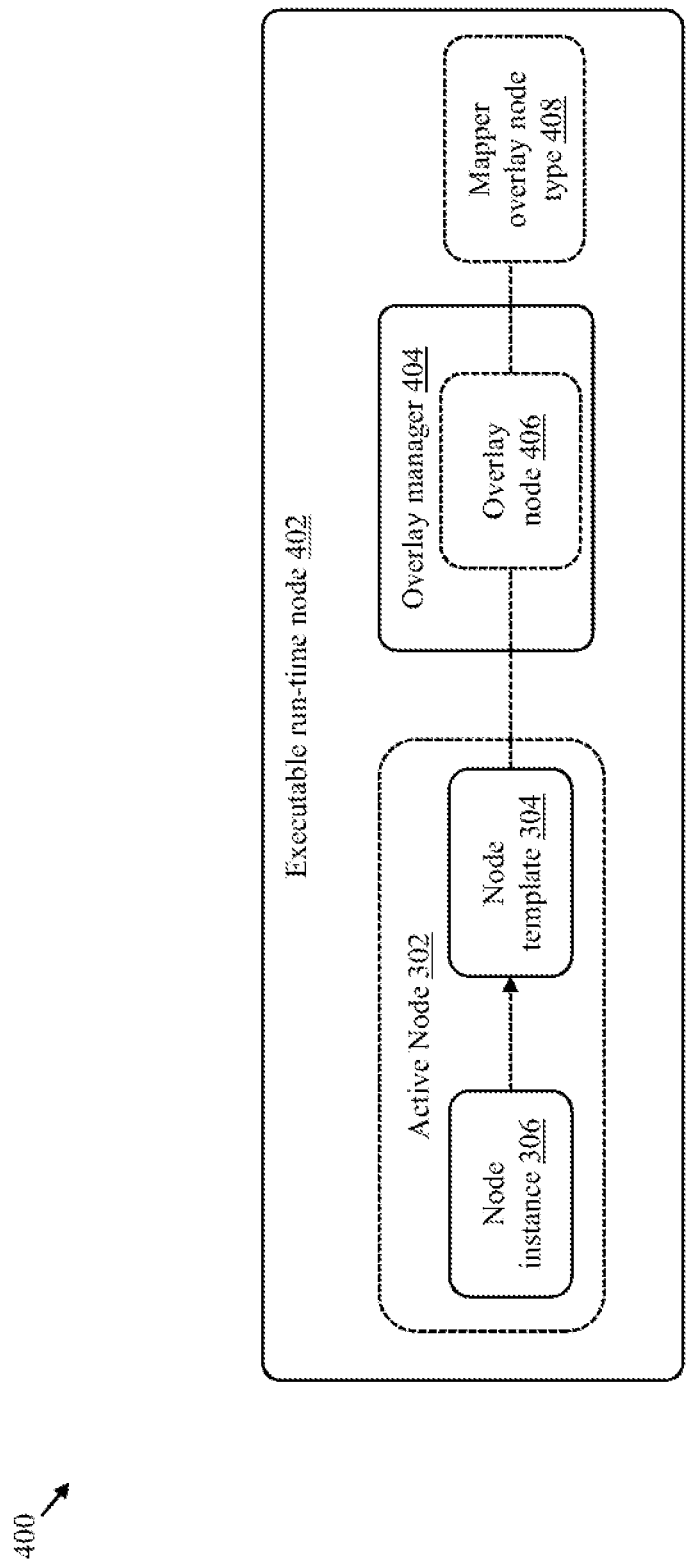
FIG. 4 is a block diagram that illustrates an executable run-time node within the executable graph-based model, in accordance with an embodiment of the present disclosure.

FIG. 4 is a block diagram that illustrates an executable run-time node 402 within the executable graph-based model 100, in accordance with an embodiment of the present disclosure. The executable run-time nodes within other executable graph-based models of the plurality of executable graph-based models 203 may be similar to the executable run-time node 402. Referring to FIG. 4, the executable run-time node 402 is shown to include an active node, e.g., the base run-time node 302, and an overlay manager 404. In the executable graph-based model 100 of FIG. 4, the base run-time node 302 is alternatively referred to as "the active node 302". In an example, the active node 302 corresponds to a data node. In other words, the active node 302 is associated with data. The overlay manager 404 includes an overlay node 406. The overlay node 406 has a mapper overlay node type 408. Thus, the overlay node 406 may be interchangeably referred to as "the mapper overlay node 406".

A mapper overlay node is a node that includes processing logic for mapping an active node (such as the active node 302) present in one executable graph-based model having one ontology to one or more active nodes present in another executable graph-based model having a different ontology, thus facilitating in-situ ontology mapping. The mapper overlay node being a base run-time node adheres to the generic structure of a base run-time node described in conjunction with FIG. 3.

The executable run-time node 402 extends the active node 302 (or is a subtype of the active node 302) such that all the functionality and properties of the active node 302 are accessible to the executable run-time node 402. The executable run-time node 402 also dynamically extends the functionality of the active node 302 by associating the overlay nodes maintained by the overlay manager 404 with the active node 302. The executable run-time node 402 may thus be considered a composition of the active node 302 and the mapper overlay node 406. The executable run-time node 402 may be alternatively referred to as a node with overlay. Therefore, the executable run-time node 402 acts as a decorator of the active node 302 adding the functionality of the overlay manager 404 to the active node 302.

Although, the executable run-time node 402 is shown to include the overlay node 406, in other embodiments, the executable run-time node 402 may include any number of overlay nodes, without deviating from the scope of the present disclosure.

It will be apparent to a person skilled in the art that the active node 302 refers to any suitable node within the executable graph-based model 100. As such, the active node 302 may be a node having a type such as a vertex node type, an edge node type, or the like.

The overlay manager 404 registers and maintains one or more overlay nodes (such as the mapper overlay node 406) associated with the active node 302. The assignment of the mapper overlay node 406 to the active node 302 (via the overlay manager 404) endows the active node 302 with processing logic and executable functionality defined within the mapper overlay node 406.

Extending the functionality of an active node through one or more overlay nodes is at the heart of the overlay system 202. As illustrated in FIG. 3, the data (e.g., a vertex node as represented by the active node 302 in FIG. 4) and the functionality that acts upon that data (e.g., an overlay node) can be separated and independently maintained offline, but at run-time, an association between the data node and the overlay node is determined and an executable run-time node is generated (e.g., the executable run-time node 402 shown in FIG. 4).

An overlay node, such as the overlay node 406 is a node having an overlay node type (alternatively referred to as an overlay type) assigned to its node type. As shown in FIG. 4, the overlay node 406 has the mapper overlay node type 408. Thus, the functionality of the active node 302 is extended to facilitate the mapping of unique ontologies between the plurality of executable graph-based models 203 in the overlay system 202 based on predefined rules. The mapping of unique ontologies is described in detail in conjunction with FIGS. 6 and 7.

It will be apparent to a person skilled in the art that the overlay type is not limited to the mapper overlay type and a number of different overlay types can be realized. Because an overlay node is itself a base run-time node, all functionality of a base run-time node described in relation to the base run-time node 302 is thus applicable to an overlay node. For example, an overlay node includes a unique ID, a name, etc., can have attributes (e.g., an overlay node can have its data defined), supports multiple inheritance, and can be configured via node configurations. Furthermore, because an overlay node is a node, the overlay node can have one or more overlay nodes associated therewith (not shown). Moreover, the processing functionality of an overlay node extends to the node type of the node to which the overlay node is applied.

An overlay node, such as the overlay node 406, is not bound to a single executable run-time node or a single executable graph-based model (unlike nodes that have non-overlay node types). This allows overlay nodes to be centrally managed and reused across multiple instances of executable graph-based models. Notably, a node (for example, a data node, an executable run-time node, and an overlay node) may be extended by way of overlays. Further, each overlay node may be extended to have one or more overlays. Such overlays may be termed chaining overlays.

Unlike non-overlay nodes, an overlay node includes processing logic (not shown in FIG. 4) which determines the functionality of the overlay node. The processing logic of an overlay node includes a block of executable code, or instructions, which carries out one or more operations associated with facilitating in-situ ontology mapping within the overlay system 202. The block of executable code is pre-compiled code, code that requires interpretation at run-time, or a combination of both. Different overlay nodes provide different processing logic to realize different functionality.

The data and the processing logic associated with one or more overlays of an executable run-time node (for example, the executable run-time node 402) are persistent. The persistent nature of the data and the processing logic are described in detail in conjunction with FIG. 5.

Figure 5:
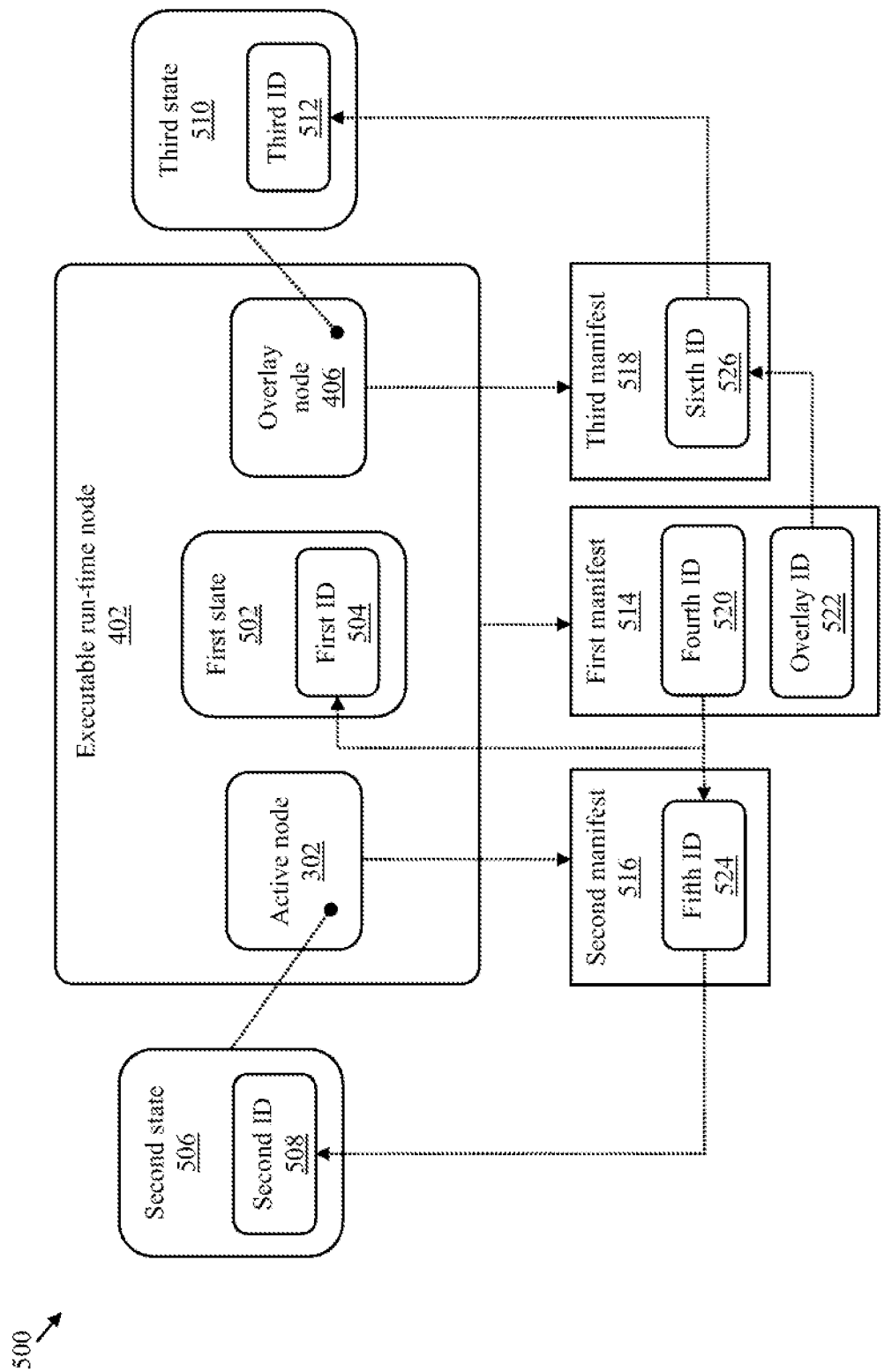
FIG. 5 is a block diagram that illustrates a composition of the executable run-time node that enables persistent storage of data and processing logic associated therewith, in accordance with an embodiment of the present disclosure.

FIG. 5 is a block diagram 500 that illustrates a composition of the executable run-time node 402 that enables persistent storage of data and the processing logic associated therewith, in accordance with an embodiment of the present disclosure.

As described in conjunction with FIG. 4, the executable run-time node 402 includes the active node 302 and the overlay node 406. The executable run-time node 402 has a first state 502 having a first ID 504. The active node 302 has a second state 506 having a second ID 508, and the overlay node 406 has a third state 510 having a third ID 512. A manifest (for example, first through third manifests 514-518) is generated for each of the active node 302, the executable run-time node 402, and the overlay node 406. In an embodiment, the manifests may be generated by the storage management module 218. The first manifest 514 is associated with the executable run-time node 402 and has a fourth ID 520 and an overlay ID 522. The second manifest 516 is associated with the active node 302 and has a fifth ID 524. The third manifest 518 is associated with the overlay node 406 and has a sixth ID 526. Further, the manifests are stored at respective storage locations that may be centralized or distributed storage locations associated with the overlay system 202. The manifests may be stored by the storage management module 218.

The first state 502 of the executable run-time node 402 includes data required to reconstruct the executable run-time node 402 (e.g., attributes, properties, etc.). The first state 502 of the executable run-time node 402 is persistently stored along with the first ID 504. The first manifest 514 is generated for the executable run-time node 402 and has (i) the fourth ID 620 (which is the same as the first ID 504), (ii) the storage location of the first state 502 of the executable run-time node 402, and (iii) the overlay ID 522. Notably, the fourth ID 520 is the same as the first ID 504 and the fifth ID 524, hence, the first manifest 514 includes the ID of the state of the active node 302 and the executable run-time node 402. Further, the overlay ID 522 is the same as the sixth ID 526 of the state of the overlay node 406. Therefore, the first manifest 514 may be used to identify and retrieve the states of the active node 302, the executable run-time node 402, and the overlay node 406. Subsequently, the retrieved states may be used to reconstruct the executable run-time node 402 and the overlay node 406. In an instance, the executable run-time node 402 may be further extended to include additional overlay nodes. In such an instance, the first manifest 514 may include state IDs of the additional overlay nodes as well. A first manifest state (not shown) is then generated for the first manifest 514 and persistently stored along with the fourth ID 520.

The second state 506 of the active node 302 includes data required to reconstruct the active node 302 (e.g., attributes, properties, etc.) and is persistently stored along with the second ID 508. The second manifest 516 is generated for the active node 302 and has (i) the fifth ID 524 and (ii) the storage location of the second state 506 of the active node 302. The second ID 508 of the second state 506 and the fifth ID 524 of the second manifest 516 are the same as the first ID 504 of the first state 502 of the executable run-time node 402 (which is also the same as the fourth ID 520 of the first manifest 514 of the executable run-time node 402). As mentioned above, along with the first state 502, the first manifest 514 may also be used to identify and retrieve the second manifest 516 which in turn may be used to identify the second state 506 of the active node 302. A second manifest state (not shown) is then generated for the second manifest 516 and persistently stored along with the fifth ID 524. Thus, the states, manifests, and manifest states for the executable run-time node 402 and the active node 302 include the same, shared, ID. A shared ID can be used in this instance because the states, manifests, and manifest states are stored separately. The separate storage of the states, manifests, and manifest states exhibit a distributed architecture of the overlay system 202.

The third state 510 of the overlay node 406 includes data required to reconstruct the overlay node 406 (e.g., attributes, properties, processing logic, etc.) and is persistently stored along with the third ID 512. The third manifest 518 is generated for the overlay node 406 and includes the sixth ID 526, which is the same as the third ID 512. Therefore, the first manifest 514 may be further used to identify and retrieve the third manifest 518 which in turn may be used to identify and retrieve the third state 510 of the overlay node 406. A third manifest state (not shown) is then generated for the third manifest 518 and is persistently stored along with the sixth ID 526.

In operation, when the executable run-time node 402 is to be loaded, the transaction module 208, in conjunction with the storage management module 218, may execute one or more operations to retrieve the first manifest state stored at a known storage location. Based on the first manifest state, the storage management module 218 may re-construct the first manifest 514 which includes the fourth ID 520 which is the same as the fifth ID 524 of the second manifest 516. Based on the fifth ID 524, the storage management module 218 may identify the second manifest state and may generate the second manifest 516 based on which the second state 506 is identified. Subsequently, the active node 302 is loaded and the storage management module 218 may determine that the active node 302 is a node with overlay. Based on the fourth ID 520 (that is the same as the first ID 504 of the first state 502 of the executable run-time node 402) of the first manifest 514, the first state 502 is identified and retrieved. Subsequently, the executable run-time node 402 is loaded. Moreover, based on the overlay ID 522 (that is the same as the sixth ID 526 of the third manifest 518) of the first manifest 514, the third manifest state is identified and the third manifest 518 is generated. Subsequently, based on the sixth ID 526 (that is the same as the third ID of the third state) of the third manifest 518, the third state 510 is identified and retrieved. Based on the third state 510, the overlay node 406 is reconstructed and loaded in the executable graph-based model 100.

In some embodiments, the overlay node 406 may not be loaded in case it is not required for executing the operation associated with the set of stimuli 230. The loaded executable run-time node 402 and the overlay node 406 may be unloaded in case they remain unused for a first predefined time period, whereas one or more executable run-time nodes that are used at least once during the predefined time period may be permanently loaded in the executable graph-based model 100. In some embodiments, the data and processing logic associated with a loaded executable run-time node and/or overlay node may be transferred to a local memory of the overlay system 202 if the data and the processing logic remain unused for a second predefined time period. Further, the data and the processing logic associated with the executable run-time node/overlay node are transferred to an external storage from the local memory in case the executable run-time node/overlay node remains unused for a third predefined time period. The third predefined time period is greater than the second predefined time period. The term unloading refers to storing a state of a node with a current version of data and processing logic associated therewith at a storage location that is pointed by the corresponding manifest.

An executable graph-based model (for example, the executable graph-based model 100) may be stored (and loaded) using the above-described composition. Beneficially, each component is stored separately thereby allowing a user to maintain and store their data independently of the storage of the structure and functionality of the executable graph-based model 100.

Notably, all manifest states are stored together at a storage location that is known to the storage management module 218. Such centralized storage of the manifest states ensures that node states associated therewith are easily accessible.

Although FIG. 5 illustrates only a single overlay node, in other embodiments, the executable node may include additional or different overlay nodes. Further, only those overlay nodes that are required for responding to the set of stimuli 230 may be loaded. The overlay system 202 described above may be used to implement systems and methods for in-situ ontology mapping in overlay system 202.

Figure 6:
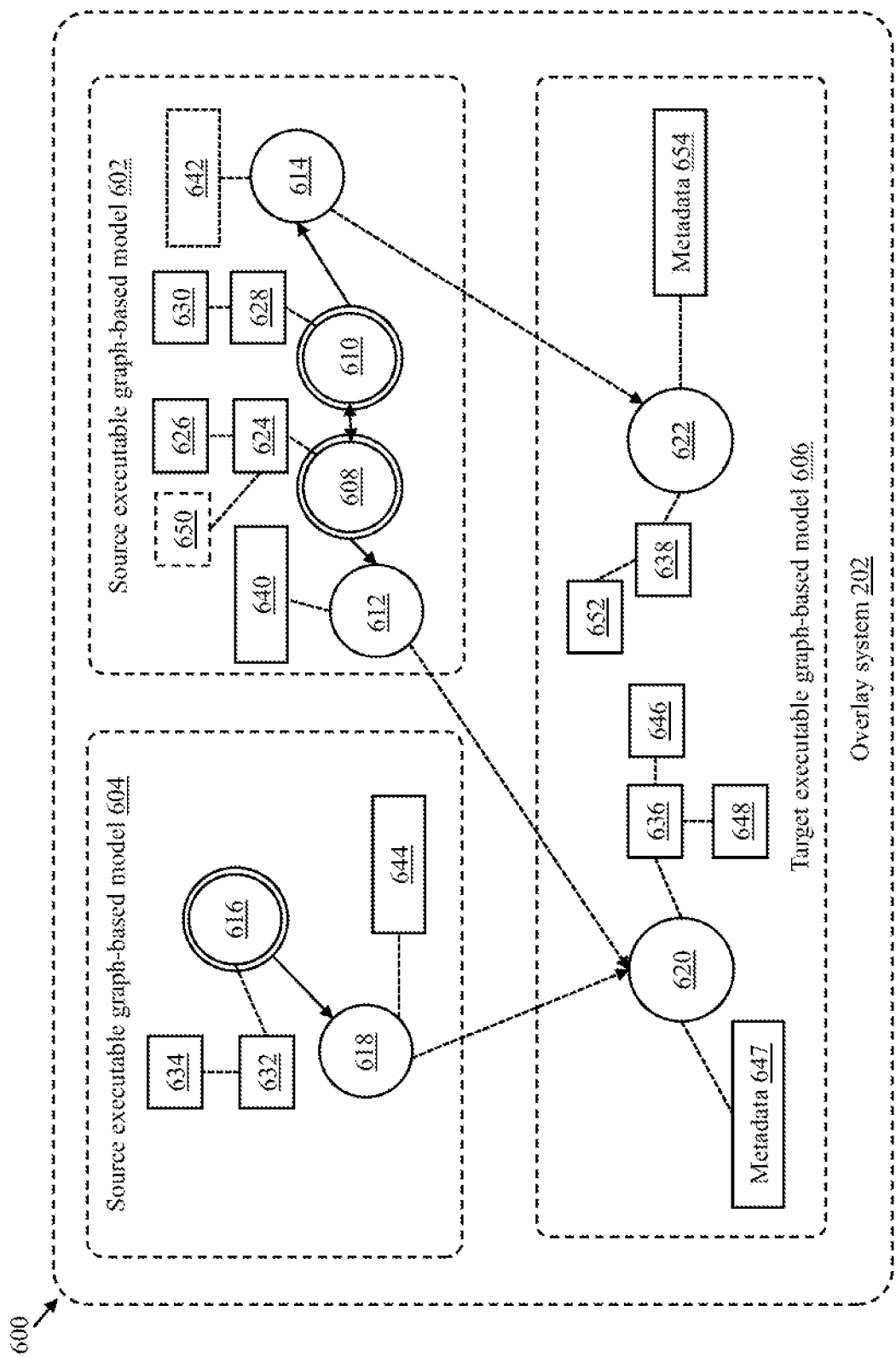
FIG. 6 is a schematic diagram that illustrates in-situ ontology mapping in the overlay system, in accordance with an embodiment of the present disclosure.

FIG. 6 is a schematic diagram 600 that illustrates in-situ ontology mapping in the overlay system 202, in accordance with an embodiment of the present disclosure. The plurality of executable graph-based models 203 of the overlay system 202 includes a set of source executable graph-based models and a set of target executable graph-based models. Each executable graph-based model, of the set of source executable graph-based models and the set of target executable graph-based models, corresponds to a unique ontology. For the sake of ongoing discussion, two source executable graph-based models (e.g., source executable graph-based models 602 and 604) of the set of source executable graph-based models, and one target executable graph-based model (e.g., a target executable graph-based model 606) of the set of target executable graph-based models are shown in FIG. 6 to describe the in-situ ontology mapping.

The source executable graph-based models 602 and 604 and the target executable graph-based model 606 are structurally and functionally similar to the executable graph-based model 100 described in conjunction with FIG. 1. Each of the source executable graph-based models 602 and 604 and the target executable graph-based model 606 corresponds to a unique ontology. That is to say, the ontology of each of the source executable graph-based models 602 and 604 and the target executable graph-based model 606 is different from each other. An ontology refers to a structural plan that defines organization and arrangement of data within an executable graph-based model. The ontology represents logical and physical design of the executable graph-based model, outlining data organization, handling of relationships between data, and constraints on the data.

The source executable graph-based model 602 includes source active nodes 608 and 610. The source active nodes 608 and 610 are structurally and functionally similar to the base run-time node 302 described in conjunction with FIG. 3. Thus, each of the source active nodes 608 and 610 includes a template and an instance. The template and instance of each of the source active nodes 608 and 610 are not shown to keep the illustration concise and clear. For the sake of brevity, the source active nodes 608 and 610 are assumed to be vertex nodes (data nodes). In such a scenario, the source active nodes 608 and 610 are coupled to each other by an edge node (not shown). Further, the source active nodes 608 and 610 are extended by mapper overlay nodes 612 and 614, respectively. In other words, the mapper overlay node 612 is an overlay of the source active node 608, and the mapper overlay node 614 is an overlay of the source active node 610. The mapper overlay nodes 612 and 614 are configured to map the source executable graph-based model 602 to the target executable graph-based model 606 to facilitate ontology mapping in the overlay system 202. In other words, the mapper overlay nodes 612 and 614 maps the source executable graph-based model 602 to the target executable graph-based model 606 to enable interoperability between the source executable graph-based model 602 and the target executable graph-based model 606. The mapping between the source executable graph-based model 602 and the target executable graph-based model 606 corresponds to an ontology mapping therebetween.

The source executable graph-based model 604 includes a source active node 616. The source active node 616 structurally and functionally adheres to the base run-time node 302 that is described in FIG. 3. Thus, the source active node 616 includes a template and an instance. The template and instance of the source active node 616 are not shown to keep the illustration concise and clear. For the sake of brevity, the source active node 616 is assumed to be a vertex node. The source active node 616 is extended by a mapper overlay node 618. In other words, the mapper overlay node 618 is an overlay of the source active node 616. The mapper overlay node 618 is configured to map the source executable graph-based model 604 to the target executable graph-based model 606 to facilitate ontology mapping in the overlay system 202. The mapping between the source executable graph-based model 604 and the target executable graph-based model 606 corresponds to an ontology mapping therebetween.

The target executable graph-based model 606 includes a target active node 620 and a target active node 622. The target active nodes 620 and 622 structurally and functionally adhere to the base run-time node 302 that is described in conjunction with FIG. 3. Thus, each of the target active nodes 620 and 622 includes a template and an instance. The template and instance of each of the target active nodes 620 and 622 are not shown to keep the illustration concise and clear. For the sake of brevity, the target active nodes 620 and 622 are assumed to be vertex nodes. In such a scenario, the target active nodes 620 and 622 are coupled to each other by an edge node (not shown). The mapping of the source executable graph-based model 602 to the target executable graph-based model 606 indicates that one or more source active nodes (such as source active nodes 608 and 610) of the source executable graph-based model 602 are mapped to one or more target active nodes (such as the target active nodes 620 and 622) of the target executable graph-based model 606. Similarly, the mapping of the source executable graph-based model 604 to the target executable graph-based model 606 indicates that one or more source active nodes (such as source active node 616) of the source executable graph-based model 604 are mapped to one or more target active nodes (such as the target active nodes 620 and 622) of the target executable graph-based model 606.

The source active node 608 includes a set of source elements 624 and a set of values 626 associated with the set of source elements 624. Similarly, the source active node 610 includes a set of source elements 628 and a set of values 630 associated therewith. Further, the source active node 616 includes a set of source elements 632 and a set of values 634 associated therewith. Additionally, the target active node 620 and the target active node 622 include a set of target elements 636 and a set of target elements 638, respectively. Each element of the sets of source elements 624, 628, and 632, and the sets of target elements 636 and 638 corresponds to one of a group consisting of an attribute (such as one of the set of attribute instances 346), a label (such as one of the set of labels 308*f*), an icon (such one of the one or more icons 308*e*), and metadata (such as the metadata 318 and 348) of the corresponding node.

The mapper overlay nodes 612 and 614 include a set of rules 640 and a set of rules 642, respectively. The source executable graph-based model 602 is mapped to the target executable graph-based model 606 based on the sets of rules 640 and 642. The set of rules 640 defines mapping for the source active node 608, whereas the set of rules 642 defines mapping for the source active node 610. Further, the mapper overlay node 618 includes a set of rules 644, and the source executable graph-based model 604 is mapped to the target executable graph-based model 606 based on the set of rules 644. The set of rules 644 defines the mapping for the source active node 616. Each rule of the sets of rules 640-644 may correspond to one of a group consisting of a logical operation, a mathematical operation, a transformation operation, a truncation operation, an indication of a target node to which the corresponding source node is to be mapped/is mapped, a list of source elements to be mapped, prioritization order, or the like.

In operation, the controller module 206, in conjunction with the ontology management module 222, is configured to map the source active node 608 to the target active node 620 based on the set of rules 640 associated with the mapper overlay node 612. Further, the controller module 206, in conjunction with the ontology management module 222, is configured to map the source active node 610 to the target active node 622 based on the set of rules 642 associated with the mapper overlay node 614. Thus, the controller module 206, in conjunction with the ontology management module 222, maps the source executable graph-based model 602 to the target executable graph-based model 606.

In one embodiment, to map the source active node 608 to the target active node 620, the controller module 206, in conjunction with the ontology management module 222, is configured to retrieve, based on the set of rules 640 of the mapper overlay node 612, the set of values 626 of the set of source elements 624. Further the controller module 206, in conjunction with the ontology management module 222, populates a set of values 646 of the set of target elements 636 of the target active node 620 based on the retrieved set of values 626 and the set of rules 640. The target active node 620 includes metadata 647. The metadata 647 indicates a source of each value of the set of values 646. Particularly, the metadata 647 is indicative of an identifier of the source executable graph-based model 602 and an identifier of the active node 608 associated with each value of the set of values 646. The metadata 647 is further indicative of a timestamp that indicates a time when each value of the set of values 646 is populated in the target executable graph-based model 606. The controller module 206, in conjunction with the ontology management module 222, may be further configured to mutate at least one of the set of values 626 upon the retrieval thereof, thereby resulting in a mutated set of values such that the set of values 646, that is populated, corresponds to the mutated set of values. The mutation of the set of values 626 is based on the set of rules 640. In some embodiments, the set of values 626 comprises a first value associated with a first source element of the set of source elements 624 and a second value associated with a second source element of the set of source elements 624, whereas the set of values 646 comprises a third value associated with a first target element of the set of target elements 636. In such a scenario, the third value is derived based on the first value, the second value, and the set of rules 640. In an example, the third value is derived from a union operation performed on the first value and the second value based on the set of rules 640. In another example, the third value is derived by performing a transformation operation on the first and second values.

The controller module 206, in conjunction with the ontology management module 222, may be further configured to map the source active node 616 to the target active node 620. The controller module 206, in conjunction with the ontology management module 222, is configured to retrieve, based on the set of rules 644 of the mapper overlay node 618, the set of values 634 of the set of source elements 632. Further, a set of values 648 of the set of target elements 636 of the target active node 620 is populated based on the retrieved set of values 634 and the set of rules 644 to map the source active node 616 to the target active node 620. As the target active node 620 is mapped to two source active nodes (i.e., the source active nodes 608 and 616), two sets of values (i.e., the sets of values 646 and 648) are associated with the set of target elements 636. Thus, the metadata 647 further indicates a source of each value of the set of values 648. Particularly, the metadata 647 is indicative of an identifier of the source executable graph-based model 604 and an identifier of the active node 616 associated with each value of the set of values 648. Additionally, as two sets of values (i.e., the sets of values 646 and 648) are associated with the set of target elements 636, the metadata 647 is further indicative of a first prioritization rule that indicates which of the sets of values 646 and 648 has a higher priority. The controller module 206, in conjunction with the ontology management module 222, may be further configured to mutate at least one of the set of values 634 upon the retrieval thereof, thereby resulting in a mutated set of values such that the set of values 648, that is populated, corresponds to the mutated set of values. The mutation of the set of values 634 is based on the set of rules 644.

The controller module 206, in conjunction with the ontology management module 222, may be further configured to delete the set of values 626 of the set of source elements 624 and the set of values 634 of the set of source elements 632 from the overlay system 202 based on the population of the sets of values 646 and 648 of the set of target elements 636, respectively. In other words, the sets of values 626 and 634 are deleted from the overlay system 202 upon the mapping of the source executable graph-based models 602 and 604 to the target executable graph-based model 606, respectively.

In the above-described embodiment, the stimuli management module 212 may be configured to receive a first stimulus, of the set of stimuli 230, associated with the overlay system 202. The first stimulus may correspond to one of a group consisting of a query and a command. The stimuli management module 212, in conjunction with the ontology management module 222 and the controller module 206, may be configured to identify the source executable graph-based model 602 from the set of source executable graph-based models for stimulus processing of the first stimulus. Further, the stimuli management module 212, in conjunction with the context module 210, the ontology management module 222, and the controller module 206, may be configured to identify the set of rules 640 based on which the source executable graph-based model 602 is mapped to the target executable graph-based model 606, based on a first context of the first stimulus. The controller module 206, in conjunction with the ontology management module 222, may be further configured to retrieve, from the target executable graph-based model 606, the set of values 646 of the set of target elements 636 based on the set of rules 640. Further, the ontology management module 222, in conjunction with the controller module 206, may be configured to populate a set of values 650 of the set of source elements 624 based on the retrieved set of values 646 and the set of rules 640. The ontology management module 222, in conjunction with the controller module 206, may be further configured to execute an operation associated with the first stimulus based on the source executable graph-based model 602 with the populated set of values 650.

As mentioned previously, the set of values 626 of the set of elements 624 gets deleted from the overlay system 202 upon the mapping of the source active node 608 to the target active node 620, to enable efficient resource utilization in the overlay system 202. Thus, the set of values 626 that is required for the execution of the operation associated with the first stimulus is unavailable in the source executable graph-based model 602. Further, as the source active node 608 is mapped to the target active node 620, the set of values 646 is retrieved from the target executable graph-based model 606 based on the set of rules 640. Further, the set of values 650 is populated in the source executable graph-based model 602 based on the retrieved set of values 646 such that the operation associated with the first stimulus is executed based on the source executable graph-based model 602 with the populated set of values 650. Thus, interoperability between the source executable graph-based model 602 and the target executable graph-based model 606 is achieved.

In an embodiment, the set of values 626 of the set of elements 624 may be modified after the mapping of the source active node 608 to the target active node 620. In such an embodiment, the mapping between the source active node 608 to the target active node 620 may be modified such that the modification to the set of values 626 is reflected in the target active node 620.

Prior to the execution of the operation associated with the first stimulus, the controller module 206, in conjunction with the ontology management module 222, may be configured to determine all the executable graph-based models that are required for executing the operation associated with the first stimulus and load, in the overlay system 202, executable graph-based models along with required nodes, that are currently not loaded, with corresponding data and processing logic. For example, in case only the source executable graph-based model 602 is not loaded, the storage management module 218 may be configured to load, in the overlay system 202, the source executable graph-based model 602. In one embodiment, each node associated with the source executable graph-based model 602 may be loaded. In another embodiment, nodes that are required for processing of the first stimulus may be loaded. In case only the target executable graph-based model 606 is not loaded, the storage management module 218 may be configured to load such an executable graph-based model in the overlay system 202, with corresponding data and processing logic. In one embodiment, each node associated with the target executable graph-based model 606 may be loaded. In another embodiment, nodes that are required for processing of the first stimulus may be loaded. In case, the source executable graph-based model 602 is loaded in the overlay system 202 and the source active node 608 is not loaded in the source executable graph-based model 602, the storage management module 218 may be configured to load such node with corresponding data and processing logic. In case, only the mapper overlay node 612 is not loaded in the source executable graph-based model 602, the storage management module 218 may be configured to load such node with corresponding data and processing logic. Multiple combinations may be possible without deviating from the scope of the present disclosure. The loading of the active nodes, mapper overlay nodes, or a combination thereof, is performed as described above in FIG. 5.

In one embodiment, the set of values 650 retrieved during the processing of the first stimulus may correspond to the set of values 646 populated during the mapping of the source active node 608 to the target active node 620. In another embodiment, the controller module 206, in conjunction with the ontology management module 222, may be further configured to mutate at least one of the set of values 646 upon the retrieval thereof, thereby resulting in a mutated set of values. The mutation of at least one of the set of values 646 may correspond to a modification of at least one of the set of values 646. The mutation is based on the set of rules 640. Thus, the set of values 650, that is populated, corresponds to the mutated version of the set of values 646.

In some embodiments, upon identifying the set of rules 640, at least one of a group consisting of the set of values 646 and the set of values 648 may be retrieved from the target executable graph-based model 606 during the processing of the first stimulus. In other words, one or more values of the set of values 646 and one or more values of the set of values 648 may be retrieved to populate the set of values 650 such that each value retrieved during the processing of the first stimulus is defined based on the set of rules 640 and the metadata 647, associated with the corresponding value. In some embodiments, upon identifying the set of rules 640, at least one of the set of values 646 and the set of values 648 may be retrieved from the target executable graph-based model 606 based on the first prioritization rule indicated by the metadata 647.

In some embodiments, the mapping of the source executable graph-based model 602 to the target executable graph-based model 606 may also include mapping of the source active node 610 to the target active node 622. Particularly, the controller module 206, in conjunction with the ontology management module 222, may be configured to map the source active node 610 to the target active node 622 based on the set of rules 642 of the mapper overlay node 614. As a result of the mapping, a set of values 652 of the set of target elements 638 is populated based on the set of values 630 of the set of source elements 628 and the set of rules 642. Further, the target active node 622 includes metadata 654 that indicates a source of each value of the set of values 652. Particularly, the metadata 654 is indicative of the identifier of the source executable graph-based model 602 and an identifier of the active node 610 associated with each value of the set of values 652. The metadata 654 is further indicative of a timestamp that indicates a time when each value of the set of values 652 is populated in the target executable graph-based model 606.

In such embodiments, when the first stimulus is received, the controller module 206, in conjunction with the ontology management module 222, identifies at least one of a group consisting of the set of rules 640 of the mapper overlay node 612 and the set of rules 642 of the mapper overlay node 614, as the set of rules required for the processing of the first stimulus.

To summarize, the plurality of executable graph-based models 203 includes a set of primary executable graph-based models and a set of auxiliary executable graph-based models. Each primary executable graph-based model may be mapped to at least one auxiliary executable graph-based model of the set of auxiliary executable graph-based models based on one or more sets of rules associated with the overlay system 202. Further, the stimuli management module 212 receives the first stimulus associated with the overlay system 202. The stimuli management module 212, in conjunction with the context module 210, the ontology management module 222, and the controller module 206, then identifies, for processing of the first stimulus, a first primary executable graph-based model from the set of primary executable graph-based models. Further, the stimuli management module 212, in conjunction with the ontology management module 222 and the controller module 206, identifies, based on the first context of the first stimulus, a first set of rules based on which the first primary executable graph-based model is mapped to at least a first auxiliary executable graph-based model, of the set of auxiliary executable graph-based models. The controller module 206, in conjunction with the ontology management module 222, further retrieves, from the first auxiliary executable graph-based model, a first set of values of a first set of auxiliary elements associated with the first auxiliary executable graph-based model based on the first set of rules. Further, the controller module 206, in conjunction with the ontology management module 222, populates a second set of values of a first set of primary elements associated with the first primary executable graph-based model based on the retrieved first set of values and the first set of rules. The controller module 206, in conjunction with the ontology management module 222, then executes an operation associated with the first stimulus based on the first primary executable graph-based model with the populated second set of values.

In reference to above described embodiments, the set of primary executable graph-based models corresponds to the set of source executable graph-based models and the set of auxiliary executable graph-based models corresponds to the set of target executable graph-based models. Particularly, the first primary executable graph-based model corresponds to the source executable graph-based model 602 and the first auxiliary executable graph-based model corresponds to the target executable graph-based model 606. Additionally, the first set of primary elements corresponds to the set of source elements 624, the first set of auxiliary elements corresponds to the set of target elements 636, and the first set of rules corresponds to the set of rules 640. Thus, the first set of values corresponds to the set of values 646 and the second set of values corresponds to the set of values 650. Additionally, each auxiliary executable graph-based model, of the set of auxiliary executable graph-based models, includes a set of auxiliary active nodes. Further, each primary executable graph-based model, of the set of primary executable graph-based models, includes a set of primary active nodes and one or more mapper overlay nodes, where each mapper overlay node is associated with one primary active node and includes a set of rules that defines the mapping for the corresponding primary active node. Additionally, the one or more mapper overlay nodes, of each primary executable graph-based model, are configured to facilitate, based on the respective one or more sets of rules, mapping of the corresponding primary executable graph-based model to at least one auxiliary executable graph-based model, of the set of auxiliary executable graph-based models. Further, each mapper overlay node facilitates, based on the corresponding set of rules, mapping of the associated primary active node to at least one auxiliary active node of the set of auxiliary active nodes associated with the corresponding auxiliary executable graph-based model. In other words, at least one primary active node associated with the corresponding primary executable graph-based model is mapped to at least one auxiliary active node associated with the corresponding auxiliary executable graph-based model to map the corresponding primary executable graph-based model to the corresponding auxiliary executable graph-based model.

Although it is described that the set of primary executable graph-based models corresponds to the set of source executable graph-based models and the set of auxiliary executable graph-based models corresponds to the set of target executable graph-based models, the scope of the present disclosure is not limited to it. In an alternate embodiment, the set of primary executable graph-based models may correspond to the set of target executable graph-based models, and the set of auxiliary executable graph-based models may correspond to the set of source executable graph-based models. In such an alternate embodiment, to map the source active node 608 to the target active node 620, the controller module 206, in conjunction with the ontology management module 222, is configured to retrieve, based on the set of rules 640 (e.g., the first set of rules) of the mapper overlay node 612, the set of source elements 624. The controller module 206, in conjunction with the ontology management module 222, is further configured to populate the metadata 647 associated with the target active node 620 based on the retrieved set of source elements 624. The identifier of the source executable graph-based model 602 and the identifier of the source active node 608 associated with the set of source elements 624 may be populated in the metadata 647. Such a mapping between the source active node 608 and the target active node 620 also indicates that the target active node 620 is mapped to the source active node 608. Thus, the target executable graph-based model 606 (e.g., the first primary executable graph-based model) is mapped to the source executable graph-based model 602 (e.g., the first auxiliary executable graph-based model).

In the above-described embodiment, the stimuli management module 212 may be configured to receive a second stimulus, of the set of stimuli 230, associated with the overlay system 202. The second stimulus may correspond to one of a group consisting of a query and a command. The stimuli management module 212, in conjunction with the context module 210, the ontology management module 222, and the controller module 206, is configured to identify the target executable graph-based model 606 (e.g., the first primary executable graph-based model) from the set of target executable graph-based models for stimulus processing of the second stimulus. Further, the stimuli management module 212, in conjunction with the ontology management module 222 and the controller module 206, is configured to identify, based on a second context of the second stimulus, the set of rules 640 based on which the target executable graph-based model 606 is mapped to the source executable graph-based model 602 (e.g., the first auxiliary executable graph-based model). The controller module 206, in conjunction with the ontology management module 222, is further configured to retrieve, from the source executable graph-based model 602, the set of values 626 (e.g., the first set of values) of the set of source elements 624 (e.g., the first set of auxiliary elements) based on at least one of the set of rules 640 (e.g., the first set of rules) and the metadata 647. Further, the controller module 206, in conjunction with the ontology management module 222, is configured to populate the set of values 646 (e.g., the second set of values) of the set of target elements 636 (e.g., the first set of primary elements) based on the retrieved set of values 626 and the set of rules

640. The controller module 206, in conjunction with the ontology management module 222, is further configured to execute an operation associated with the second stimulus based on the target executable graph-based model 606 with the populated set of values 646.

The mapping between the target executable graph-based model 606 and the source executable graph-based model 602 does not involve population of the set of values 646 in the target executable graph-based model 606 to enable efficient resource utilization. Thus, the set of values 646 that is required for the execution of the operation associated with the second stimulus was unavailable in the target executable graph-based model 606 upon the reception of the second stimulus. Further, as the metadata 647 is indicative of the identifier of the source executable graph-based model 602 and the source active node 608 that is mapped to the target active node 620, the set of rules 640 is identified. Further, the set of values 626 is retrieved from the source executable graph-based model 602 based on the set of rules 640. The set of values 646 is populated in the target executable graph-based model 606 based on the retrieved set of values 626 such that the operation associated with the second stimulus is executed based on the target executable graph-based model 606 with the populated set of values 646. Thus, interoperability between the source executable graph-based model 602 and the target executable graph-based model 606 is achieved.

The controller module 206, in conjunction with the ontology management module 222, may be further configured to mutate at least one of the set of values 626 upon the retrieval thereof, thereby resulting in a mutated version of the set of values 626. The mutation is based on the set of rules 640. Thus, the set of values 646, that is populated, corresponds to the mutated version of the set of values 626. Prior to the execution of the operation associated with the second stimulus, the controller module 206, in conjunction with the ontology management module 222, may be configured to determine all the executable graph-based models that are required for executing the operation associated with the second stimulus and load, in the overlay system 202, executable graph-based models with required nodes, that are currently not loaded, with corresponding data and processing logic. For example, in case only the target executable graph-based model 606 is not loaded, the storage management module 218 may be configured to load, in the overlay system 202, the target executable graph-based model 606. In case only the source executable graph-based model 602 is not loaded, the storage management module 218 may be configured to load such an executable graph-based model in the overlay system 202 with corresponding data and processing logic.

In the above described embodiment, the controller module 206, in conjunction with the ontology management module 222, may be further configured to map the source active node 616 to the target active node 620. In such a scenario, the controller module 206, in conjunction with the ontology management module 222, is configured to retrieve, based on the set of rules 644 of the mapper overlay node 618, the set of source elements 632 from the source executable graph-based model 604. Further, the controller module 206, in conjunction with the ontology management module 222, is configured to populate the metadata 647 associated with the target active node 620 based on the retrieved set of source elements 632. The identifier of the source executable graph-based model 604 and the identifier of the source active node 616 associated with the set of source elements 632 may be populated in the metadata 647. Additionally, as two sets of elements (i.e., the sets of elements 624 and 632) are associated with the set of target elements 636, the metadata 647 is further indicative of a second prioritization rule that indicates which of the sets of elements 624 and 632 has a higher priority. Such a mapping between the source active node 616 and the target active node 620 also indicates that the target active node 620 is mapped to the source active node 616, thereby the target executable graph-based model 606 is mapped to the source executable graph-based model 604.

In the above-described embodiment, the stimuli management module 212 may be configured to receive a third stimulus, of the set of stimuli 230, associated with the overlay system 202. The third stimulus may correspond to one of a group consisting of a query and a command. The stimuli management module 212, in conjunction with the context module 210, the ontology management module 222, and the controller module 206, is configured to identify the target executable graph-based model 606 from the set of target executable graph-based models for stimulus processing of the third stimulus. Further, the stimuli management module 212, in conjunction with the ontology management module 222 and the controller module 206, is configured to identify one of the sets of rules 640 and 644 based on the second prioritization rule indicated in the metadata 647. For the sake of ongoing discussion it is assumed that the set of rules 644 is identified based on the second prioritization rule indicated in the metadata 647.

The controller module 206, in conjunction with the ontology management module 222, is further configured to retrieve, from the source executable graph-based model 604, the set of values 634 of the set of source elements 632 based on at least one of the set of rules 644 and the metadata 647. Further, the controller module 206, in conjunction with the ontology management module 222, is configured to populate the set of values 648 of the set of target elements 636 based on the retrieved set of values 634 and the set of rules 644. The controller module 206, in conjunction with the ontology management module 222, is further configured to execute an operation associated with the third stimulus based on the target executable graph-based model 606 with the populated set of values 648.

Prior to the execution of the operation associated with the third stimulus, the controller module 206, in conjunction with the ontology management module 222, may be configured to determine all the executable graph-based models that are required for executing the operation associated with the third stimulus and load, in the overlay system 202, executable graph-based models with required nodes, that are currently not loaded, with corresponding data and processing logic. For example, in case only the target executable graph-based model 606 is not loaded, the storage management module 218 may be configured to load, in the overlay system 202, the target executable graph-based model 606. In case only the source executable graph-based model 604 is not loaded, the storage management module 218 may be configured to load such an executable graph-based model in the overlay system 202 with corresponding data and processing logic.

In reference to the above described embodiment, each primary executable graph-based model, of the set of primary executable graph-based models, includes a set of primary active nodes. Further, each auxiliary executable graph-based model, of the set of auxiliary executable graph-based models, includes a set of auxiliary active nodes and one or more mapper overlay nodes, where each mapper overlay node is associated with one auxiliary active node and includes a set of rules that defines the mapping for the corresponding auxiliary active node. Additionally, the one or more mapper overlay nodes, of each auxiliary executable graph-based model, are configured to facilitate, based on the respective one or more sets of rules, mapping of the corresponding auxiliary executable graph-based model to at least one primary executable graph-based model, of the set of primary executable graph-based models. Each mapper overlay node facilitates, based on the corresponding set of rules, mapping of the associated auxiliary active node to at least one primary active node of the set of primary active nodes associated with the corresponding primary executable graph-based model.

In reference to the above-described embodiments, each active node of the set of primary active nodes and the set of auxiliary active nodes may comprise a node template (such as the node template 304) and a node instance (such as the node instance 306), where the node template corresponds to a predefined node structure and the node instance corresponds to an implementation of the node template.

In reference to the above-described embodiments, in some embodiments, at least one primary active node, of the set of primary active nodes, is derived from one or more primary source active nodes of the set of primary active nodes. Additionally, at least one mapper overlay node, of one or more mapper overlay nodes, may be derived from at least one remaining mapper overlay node of the one or more mapper overlay nodes. In such an embodiment, while loading a mapper overlay node that is derived from another mapper overlay node into the corresponding executable graph-based model, the mapper overlay node that is derived from, is also loaded into the corresponding executable graph-based model. Similarly, at least one auxiliary active node, of the set of auxiliary active nodes, may be derived from one or more remaining auxiliary active nodes of the set of auxiliary active nodes.

In reference to the above-described embodiments, in one embodiment, each active node of the set of primary active nodes and the set of auxiliary active nodes may correspond to a data node. In another embodiment, each active node of the set of primary active nodes and the set of auxiliary active nodes may comprise a data node and a non-mapper overlay node. Examples of a non-mapper overlay node include an encryption overlay node, an obfuscation overlay node, an audit overlay node, a history overlay node, a handler overlay node, a publisher overlay node, or the like. In yet another embodiment, each active node of the set of primary active nodes and the set of auxiliary active nodes may correspond to an edge node.

Although the source executable graph-based model 602 is shown to include two source active nodes (e.g., the source active nodes 608 and 610) and two mapper overlay nodes (e.g., the mapper overlay nodes 612, 614, and 618) associated therewith, the scope of the present disclosure is not limited to it. In other embodiments, the source executable graph-based model 602 may include more than two source active nodes and mapper overlay nodes associated therewith. Similarly, in other embodiments, the source executable graph-based model 604 may include more than one source active node and mapper overlay node. Additionally, in other embodiments, the target executable graph-based model 606 may include more than two target active nodes.

Although it is described that each of the mapper overlay nodes 612, 614, and 616 maps the associated source active node to one target active node, the scope of the present disclosure is not limited to it. In other embodiments, the mapper overlay node 612 may map the source active node 608 to more than one target active node of the target executable graph-based model 606. Similarly, the mapper overlay node 614 may map the source active node 610 to more than one target active node of the target executable graph-based model 606. Additionally, the mapper overlay node 618 maps the source active node 616 to more than one target active node of the target executable graph-based model 606.

Although it is described that the source executable graph-based models 602 and 604 are mapped to the target executable graph-based model 606, the scope of the present disclosure is not limited to it. In other embodiments, the source executable graph-based models 602 and 604 may be mapped to more than one target executable graph-based model and the target executable graph-based model 606 may be mapped to less than two or more than two source executable graph-based models. Additionally, in one embodiment, the source executable graph-based model 602 may be mapped to the source executable graph-based model 604, without deviating from the scope of the present disclosure.

Although FIG. 6 describes ontology mapping between templatized executable graph-based models, the scope of the present disclosure is not limited to it. In other embodiments, the ontology mapping may be facilitated between non-templated executable graph-based models in a similar manner as described in conjunction with FIG. 6.

Figure 7:
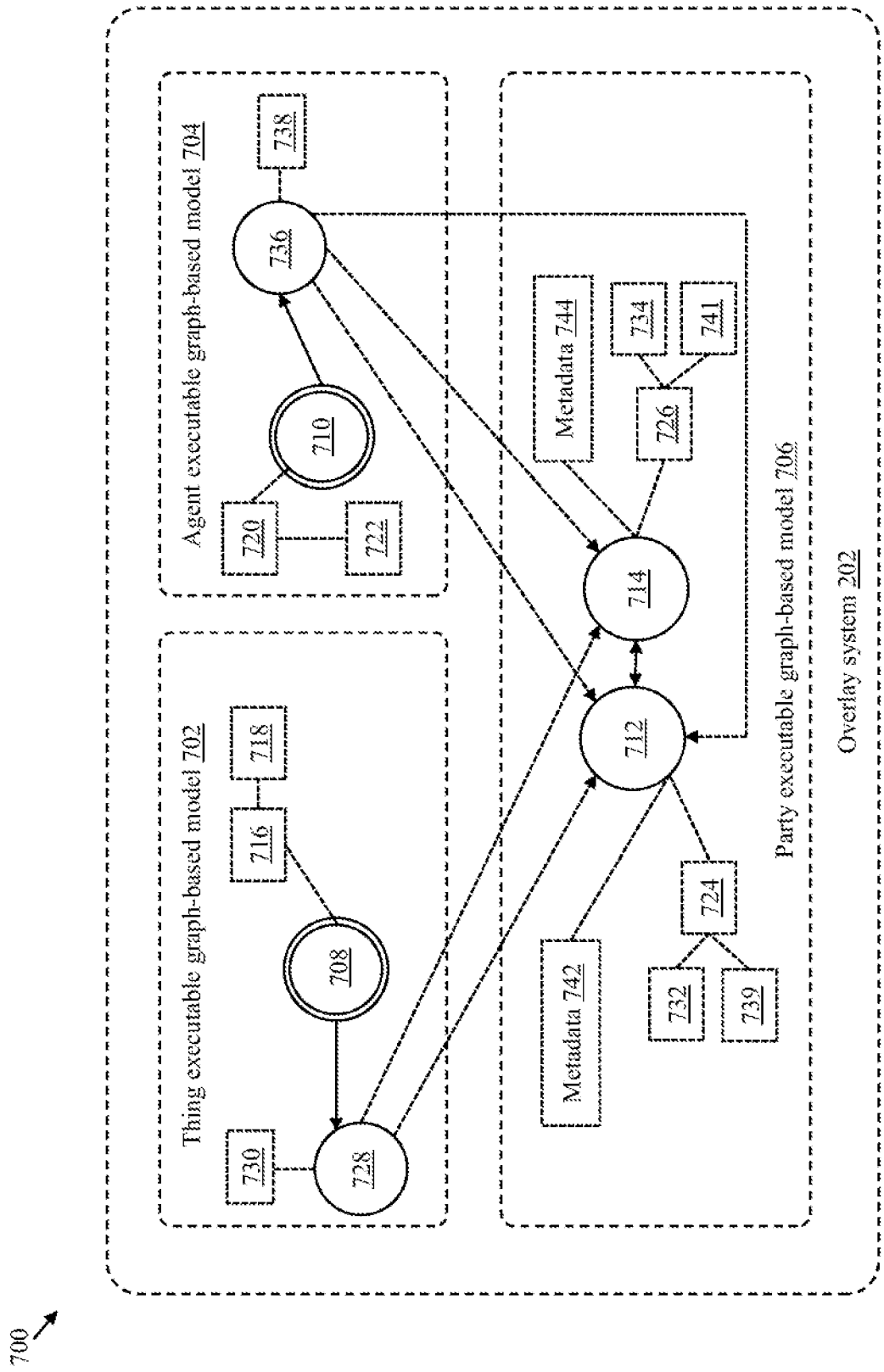
FIG. 7 is a schematic diagram that illustrates an example implementation of in-situ ontology mapping in the overlay system, in accordance with an embodiment of the present disclosure.

FIG. 7 is a schematic diagram 700 that illustrates an example implementation of in-situ ontology mapping in the overlay system 202, in accordance with an embodiment of the present disclosure. Referring to FIG. 7, a thing executable graph-based model 702, an agent executable graph-based model 704, and a party executable graph-based model 706 are shown to be included in the overlay system 202. The thing executable graph-based model 702 is an executable graph-based model that represents an industry-standard ontology based on things. Similarly, the agent executable graph-based model 704 corresponds to another industry standard ontology based on agents. The party executable graph-based model 706 represents an industry-standard ontology based on parties. The thing executable graph-based model 702 and the agent executable graph-based model 704 are structurally and functionally similar to the source executable graph-based model 602 and the source executable graph-based model 604, respectively, whereas the party executable graph-based model 706 is structurally and functionally similar to the target executable graph-based model 606. The thing executable graph-based model 702 includes a thing node 708, and the agent executable graph-based model 704 includes an agent node 710. The thing node 708 and the agent node 710 correspond to vertex nodes. The party executable graph-based model 706 includes a party node 712 and a party node 714. The party node 712 and the party node 714 correspond to vertex nodes and may be coupled to each other by an edge node (not shown). The thing node 708, the agent node 710, the party node 712, and the party node 714 are structurally and functionally similar to the base run-time node 302, as shown in FIG. 3.

The thing node 708 includes a set of elements 716 and a set of values 718 associated therewith. The set of elements 716 includes four elements that correspond to a given name, a family name, an additional name, and a birth date. In an example, the set of values 718 includes 'James', 'Smith', 'William', and '09-09-1999' (i.e., in dd-mm-yyyy format). Thus, 'James' is the value for the given name, 'Smith' is the value for the family name, 'William' is the value for the additional name, and '09-09-1999' is the value for the birth date. The agent node 710 includes a set of elements 720 and a set of values 722 associated therewith. The set of elements 720 includes four elements that correspond to the first name, the family name, a birthday, and an age. In an example, the set of values 722 includes 'Jim', 'Brown', '11-11' (i.e., in dd-mm format), and '24' (i.e., in years). Thus, 'Jim' is the value for the first name, 'Brown' is the value for the family name, '11-11' is the value for the birthday, and '24' is the value for the age. Further, the party node 712 comprises a set of elements 724. The set of elements 724 includes five elements that correspond to the first name, the last name, the additional name, another last name, and a middle name. Similarly, the party node 714 includes a set of elements 726. The set of elements 726 includes two elements that correspond to the date of birth and the age. In an example, each of the sets of elements 716, 720, 724, and 726 corresponds to a set of attribute instances (such as the set of attribute instances 346).

The thing executable graph-based model 702 includes a mapper overlay node 728. In other words, the thing node 708 is extended by the mapper overlay node 728. The mapper overlay node 728 includes a set of rules 730. The mapper overlay node 728 facilitates mapping of the thing node 708 to the party node 712 and the party node 714, based on the set of rules 730, thereby mapping the thing executable graph-based model 702 to the party executable graph-based model 706. During the mapping of the thing node 708 to the party node 712, first through third values of the set of values 718 are retrieved from the thing executable graph-based model 702, and first through third values of a set of values 732 of the set of elements 724 are populated, respectively, based on the set of rules 730. In other words, 'James' which is the value for the given name, 'Smith' which is the value for the family name, and 'William' which is the value for the additional name are retrieved from the thing executable graph-based model 702 and populated as the first through third values of the set of values 732. Thus, the first through third values of the set of values 732 correspond to 'James', 'Smith', and 'William', which corresponds to the values of the first name, the last name, and the additional name, respectively. Further, during the mapping of the thing node 708 to the party node 714, fifth value of the set of values 718 is retrieved and a first value of a set of values 734 of the set of elements 726 is populated. In other words, '09-09-1999' which is the value for the birth date is retrieved from the thing executable graph-based model 702 and populated as a value for the date of birth which is a first element of the set of elements 726.

The agent executable graph-based model 704 includes a mapper overlay node 736. The mapper overlay node 736 includes a set of rules 738. The mapper overlay node 736 facilitates mapping of the agent node 710 to the party node 712 and the party node 714 based on the set of rules 738, thereby mapping the agent executable graph-based model 704 to the party executable graph-based model 706. During the mapping of the agent node 710 to the party node 712, a first value and a second value of the set of values 722 are retrieved from the agent executable graph-based model 704. Further, a first value and a second value of a set of values 739 of the set of elements 724 are populated based on the retrieved first and second values, respectively. In other words, 'Jim' which is the value for the first name, and 'Brown' which is the value for the family name are retrieved and populated as values for the first name and the last name, respectively, in the party executable graph-based model 706. Further, during the mapping of the agent node 710 to the party node 714, third and fourth values of the set of values 722 are retrieved and a first value and a second value of a set of values 741 of the set of elements 726 are populated based on the retrieved values and the set of rules 738. Particularly, the first value of the set of values 741 is derived from the third and fourth values of the set of values 722 and the second value of the set of values 741 corresponds to the retrieved fourth value. In other words, '11-11' which is the value for the birthday, and '24' which is the value for the age are retrieved. Further, '11-11-1999' which is the value for the date of birth in the party executable graph-based model 706 is derived by utilizing the values for the birthday (i.e., '11-11') and age (i.e., '24') based on the set of rules 738. Further, '11-11-1999' which is the value for the date of birth and '24' which is the value for the age is populated in the party executable graph-based model 706.

The party node 712 and the party node 714, include metadata 742 and metadata 744, respectively. The metadata 742 indicates a source of each value of the set of values 732, a timestamp when each value of the set of values 732 was populated, a source of each value of the set of values 739, and a timestamp when each value of the set of values 739 was populated. Additionally, as two sets of values (i.e., the sets of values 732 and 739) are associated with the set of elements 724, the metadata 742 is further indicative of a third prioritization rule that indicates which of the sets of values 732 and 739 has a higher priority. Similarly, the metadata 744 indicates a source of each value of the set of values 734, a timestamp when each value of the set of values 734 was populated, a source of each value of the set of values 741, and a timestamp when each value of the set of values 741 was populated. Additionally, as two sets of values (i.e., the sets of values 734 and 741) are associated with the set of elements 726, the metadata 744 is further indicative of a fourth prioritization rule that indicates which of the sets of values 734 and 741 has a higher priority.

The set of values 718 and the set of values 722 are deleted from the thing executable graph-based model 702 and the agent executable graph-based model 704, respectively, upon the mapping, such that the memory requirement of the thing executable graph-based model 702 and the agent executable graph-based model 704 is reduced. In other words, the set of values 718 and the set of values 722 are deleted to enable efficient resource utilization.

In operation, the stimuli management module 212 receives a fourth stimulus. The fourth stimulus corresponds to a query. The stimuli management module 212, in conjunction with the context module 210, the controller module 206, and the ontology management module 222, identifies that the fourth stimulus is directed to the thing executable graph-based model 702. The stimuli management module 212 further identifies that the fourth stimulus corresponds to a query that indicates a requirement of the given name. As the set of values 718 is deleted from the overlay system 202, the value (i.e., James) associated with the first name in the party executable graph-based model 706 is retrieved and populated in the thing executable graph-based model 702 as a value associated with the given name based on the mapping between the thing executable graph-based model 702 and the party executable graph-based model 706.

Particularly, the stimuli management module 212, in conjunction with the controller module 206 and the ontology management module 222, identifies the thing node 708 in the thing executable graph-based model 702 for processing the fourth stimulus. Further, the ontology management module 222, in conjunction with the controller module 206, identifies that the mapper overlay node 728 is associated with the thing node 708 as the value for the given name is unavailable in the thing executable graph-based model 702. As values, i.e., 'James' and 'Jim' are associated with the first name in the party executable graph-based model 706, 'James' is retrieved, as the identifier of the thing executable graph-based model 702 is associated with 'James' in the metadata 742. Further, 'James' is populated as the value associated with the given name in the thing executable graph-based model 702. Upon the population, an outcome (such as the outcome 234) is generated.

The stimuli management module 212 may further receive a fifth stimulus. The fifth stimulus corresponds to a query. The stimuli management module 212, in conjunction with the context module 210, the controller module 206, and the ontology management module 222, identifies that the fifth stimulus is directed to the agent executable graph-based model 704. The stimuli management module 212 further identifies that the fifth stimulus corresponds to a query that indicates a requirement of the value associated with the birthday in the agent node 710. As the set of values 722 is deleted from the overlay system, the ontology mapping between the agent executable graph-based model 704 and the party executable graph-based model 706 is utilized to execute an operation associated with the fifth stimulus.

Particularly, the stimuli management module 212 in conjunction with the controller module 206 and the ontology management module 222, identifies the agent node 710, in the agent executable graph-based model 704. Further, the ontology management module 222 in conjunction with the controller module 206, identifies that the mapper overlay node 736 is associated with the agent node 710 as the value for the birthday is not present in the agent executable graph-based model 704. Further, '11-11-1999' and '24' that correspond to the values associated with the data of birth and age are retrieved from the party executable graph-based model 706 as the identifier of the agent executable graph-based model 704 is associated with '11-11-1999' and '24' in the metadata 744. Further, retrieved '11-11-1999' and '24' are mutated based on the set of rules 738 to arrive at '11-11' which is the value associated with the birthday. Further, '11-11' is populated as the value associated with the birthday in the thing executable graph-based model 702. Upon the population, an outcome (such as the outcome 234) is generated.

The stimuli management module 212 may further receive a sixth stimulus. The sixth stimulus corresponds to a query. The stimuli management module 212, in conjunction with the context module 210, the controller module 206, and the ontology management module 222, identifies that the sixth stimulus is directed to the party executable graph-based model 706. The stimuli management module 212 further identifies that the sixth stimulus corresponds to a query that indicates a requirement of the value associated with the first name in the party node 712. Two values (i.e., James and Jim) are associated with the first name in the party node 712 based on the ontology mapping of party executable graph-based model 706 with the thing executable graph-based model 702 and the agent executable graph-based model 704. Thus, the stimuli management module 212 in conjunction with the controller module 206 and the ontology management module 222, may identify one of the two values (i.e., James and Jim) based on the third prioritization rule indicated by the metadata 742. For the sake of ongoing discussion, it is assumed that James had a higher priority over Jim, thus James is identified as the first name and an outcome is generated.

Figure 8:
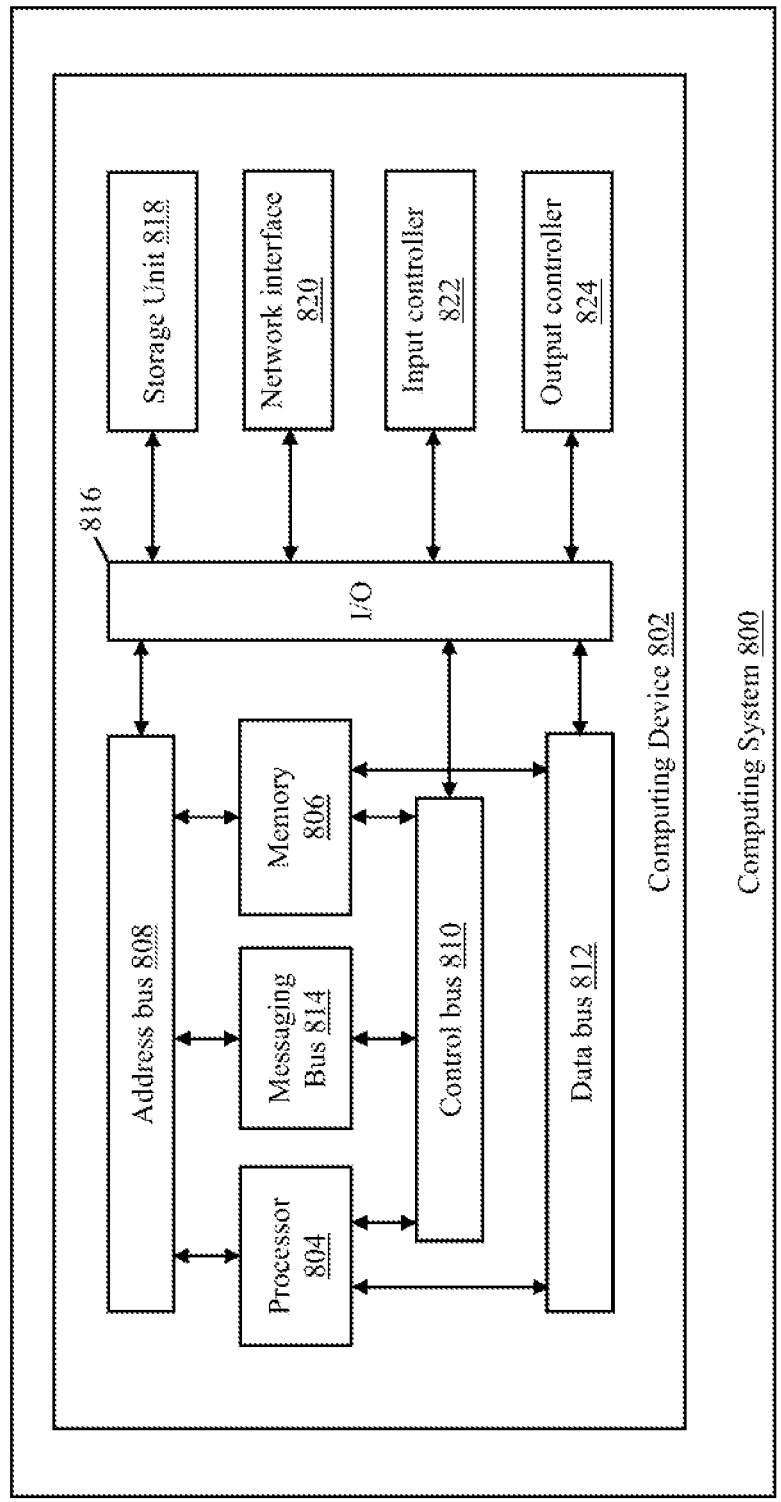
FIG. 8 shows an example computing system for carrying out methods of the present disclosure, in accordance with an embodiment of the present disclosure.

FIG. 8 shows an example computing system 800 for carrying out the methods of the present disclosure, in accordance with an embodiment of the present disclosure. Specifically, FIG. 8 shows a block diagram of an embodiment of the computing system 800 according to example embodiments of the present disclosure.

The computing system 800 may be configured to perform any of the operations disclosed herein, such as, for example, any of the operations discussed with reference to the functional modules described in relation to FIG. 2. The computing system 800 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 800 is a distributed system configured to function using multiple computing machines interconnected via a data network or bus system.

The computing system 800 includes computing devices (such as a computing device 802). The computing device 802 includes one or more processors (such as a processor 804) and a memory 806. The processor 804 may be any general-purpose processor(s) configured to execute a set of instructions. For example, the processor 804 may be a processor core, a multiprocessor, a reconfigurable processor, a microcontroller, a digital signal processor (DSP), an application-specific integrated circuit (ASIC), a graphics processing unit (GPU), a neural processing unit (NPU), an accelerated processing unit (APU), a brain processing unit (BPU), a data processing unit (DPU), a holographic processing unit (HPU), an intelligent processing unit (IPU), a microprocessor/microcontroller unit (MPU/MCU), a radio processing unit (RPU), a tensor processing unit (TPU), a vector processing unit (VPU), a wearable processing unit (WPU), a field programmable gate array (FPGA), a programmable logic device (PLD), a controller, a state machine, gated logic, discrete hardware component, any other processing unit, or any combination or multiplicity thereof. In one embodiment, the processor 804 may be multiple processing units, a single processing core, multiple processing cores, special purpose processing cores, co-processors, or any combination thereof. The processor 804 may be communicatively coupled to the memory 806 via an address bus 808, a control bus 810, a data bus 812, and a messaging bus 814.

The memory 806 may include non-volatile memories such as a read-only memory (ROM), a programmable read-only memory (PROM), an erasable programmable read-only memory (EPROM), a flash memory, or any other device capable of storing program instructions or data with or without applied power. The memory 806 may also include volatile memories, such as a random-access memory (RAM), a static random-access memory (SRAM), a dynamic random-access memory (DRAM), and a synchronous dynamic random-access memory (SDRAM). The memory 806 may include single or multiple memory modules. While the memory 806 is depicted as part of the computing device 802, a person skilled in the art will recognize that the memory 806 can be separate from the computing device 802.

The memory 806 may store information that can be accessed by the processor 804. For instance, the memory 806 (e.g., one or more non-transitory computer-readable storage mediums, memory devices) may include computer-readable instructions (not shown) that can be executed by the processor 804. The computer-readable instructions may be software written in any suitable programming language or may be implemented in hardware. Additionally, or alternatively, the computer-readable instructions may be executed in logically and/or virtually separate threads on the processor 804. For example, the memory 806 may store instructions (not shown) that when executed by the processor 804 cause the processor 804 to perform operations such as any of the operations and functions for which the computing system 800 is configured, as described herein. Additionally, or alternatively, the memory 806 may store data (not shown) that can be obtained, received, accessed, written, manipulated, created, and/or stored. The data can include, for instance, the data and/or information described herein in relation to FIGS. 1-7. In some implementations, the computing device 802 may obtain from and/or store data in one or more memory device(s) that are remote from the computing system 800.

The computing device 802 may further include an input/output (I/O) interface 816 communicatively coupled to the address bus 808, the control bus 810, and the data bus 812. The data bus 812 and messaging bus 814 may include a plurality of tunnels that may support parallel execution of messages by the overlay system 202. The I/O interface 816 is configured to couple to one or more external devices (e.g., to receive and send data from/to one or more external devices). Such external devices, along with the various internal devices, may also be known as peripheral devices. The I/O interface 816 may include both electrical and physical connections for operably coupling the various peripheral devices to the computing device 802. The I/O interface 816 may be configured to communicate data, addresses, and control signals between the peripheral devices and the computing device 802. The I/O interface 816 may be configured to implement any standard interface, such as a small computer system interface (SCSI), a serial-attached SCSI (SAS), a fiber channel, a peripheral component interconnect (PCI), a PCI express (PCIe), a serial bus, a parallel bus, an advanced technology attachment (ATA), a serial ATA (SATA), a universal serial bus (USB), Thunderbolt, FireWire, various video buses, and the like. The I/O interface 816 is configured to implement only one interface or bus technology. Alternatively, the I/O interface 816 is configured to implement multiple interfaces or bus technologies. The I/O interface 816 may include one or more buffers for buffering transmissions between one or more external devices, internal devices, the computing device 802, or the processor 804. The I/O interface 816 may couple the computing device 802 to various input devices, including mice, touch screens, scanners, biometric readers, electronic digitizers, sensors, receivers, touchpads, trackballs, cameras, microphones, keyboards, any other pointing devices, or any combinations thereof. The I/O interface 816 may couple the computing device 802 to various output devices, including video displays, speakers, printers, projectors, tactile feedback devices, automation control, robotic components, actuators, motors, fans, solenoids, valves, pumps, transmitters, signal emitters, lights, and so forth.

The computing system 800 may further include a Storage Unit 818, a network interface 820, an input controller 822, and an output controller 824. The Storage Unit 818, the network interface 820, the input controller 822, and the output controller 824 are communicatively coupled to the central control unit (e.g., the memory 806, the address bus 808, the control bus 810, and the data bus 812) via the I/O interface 816. The network interface 820 communicatively couples the computing system 800 to one or more networks such as wide area networks (WAN), local area networks (LAN), intranets, the Internet, wireless access networks, wired networks, mobile networks, telephone networks, optical networks, or combinations thereof. The network interface 820 may facilitate communication with packet-switched networks or circuit-switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

The storage unit 818 is a computer-readable medium, preferably a non-transitory computer-readable medium, comprising one or more programs, the one or more programs comprising instructions which when executed by the processor 804 cause the computing system 800 to perform the method steps of the present disclosure. Alternatively, the Storage Unit 818 is a transitory computer-readable medium. The storage unit 818 can include a hard disk, a floppy disk, a compact disc read-only memory (CD-ROM), a digital versatile disc (DVD), a Blu-ray disc, a magnetic tape, a flash memory, another non-volatile memory device, a solid-state drive (SSD), any magnetic storage device, any optical storage device, any electrical storage device, any semiconductor storage device, any physical-based storage device, any other data storage device, or any combination or multiplicity thereof. In one embodiment, the storage unit 818 stores one or more operating systems, application programs, program modules, data, or any other information. The storage unit 818 is part of the computing device 802. Alternatively, the storage unit 818 is part of one or more other computing machines that are in communication with the computing device 802, such as servers, database servers, cloud storage, network attached storage, and so forth.

The input controller 822 may include suitable logic, circuitry, interfaces, and/or code, executable by the circuitry, that may be configured to control one or more input devices that may be configured to receive an input (the set of stimuli 230) for the overlay system 202. The output controller 824 may include suitable logic, circuitry, interfaces, and/or code, executable by the circuitry, that may be configured to control one or more output devices that may be configured to render/output the outcome of the operation executed to process the received input (the set of stimuli 230).

Figure 9A:
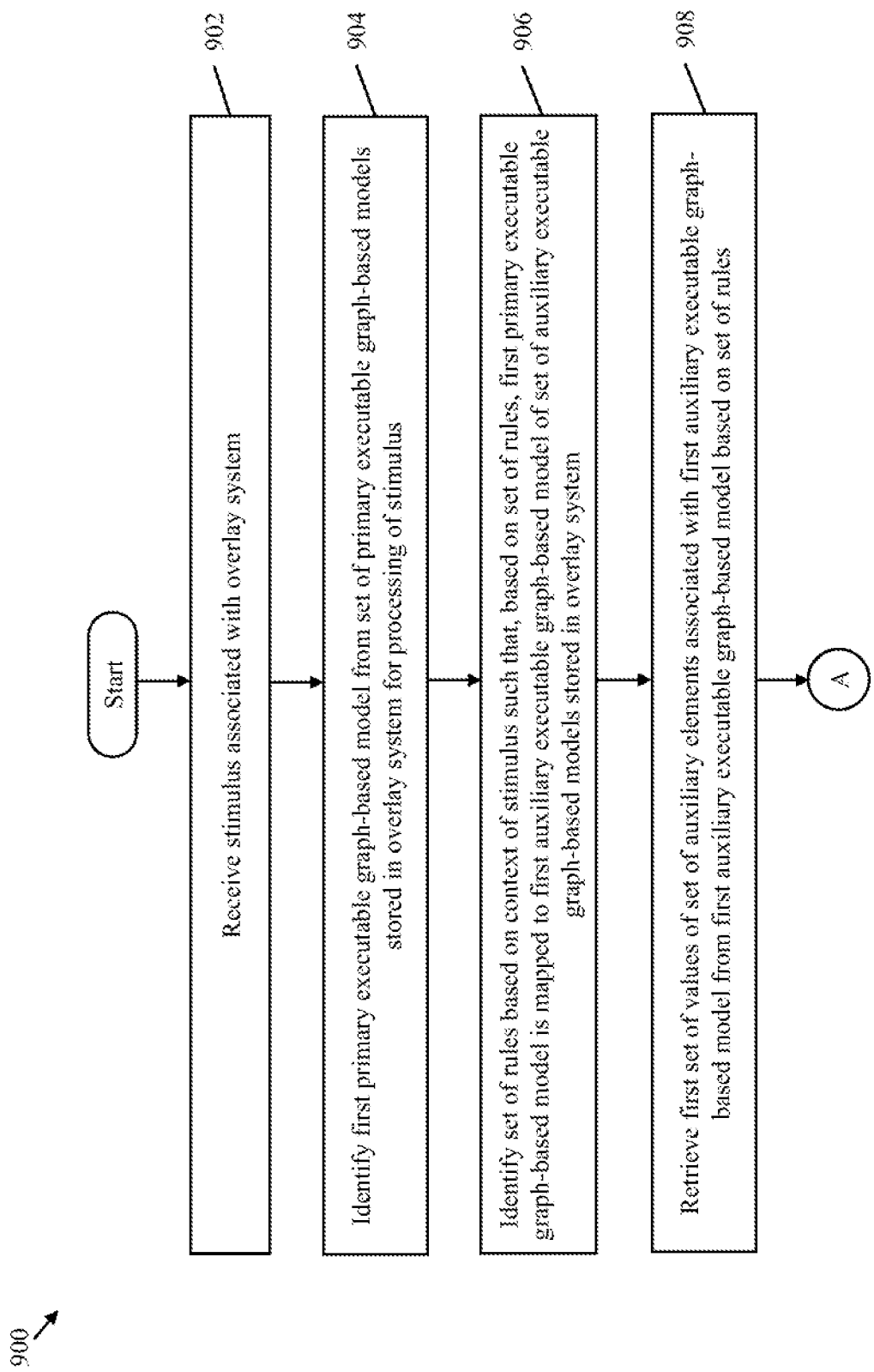
FIGS. 9A and 9B, collectively, represent a flowchart that illustrates a method for facilitating in-situ ontology mapping in the overlay system, in accordance with an embodiment of the present disclosure.
Figure 9B:
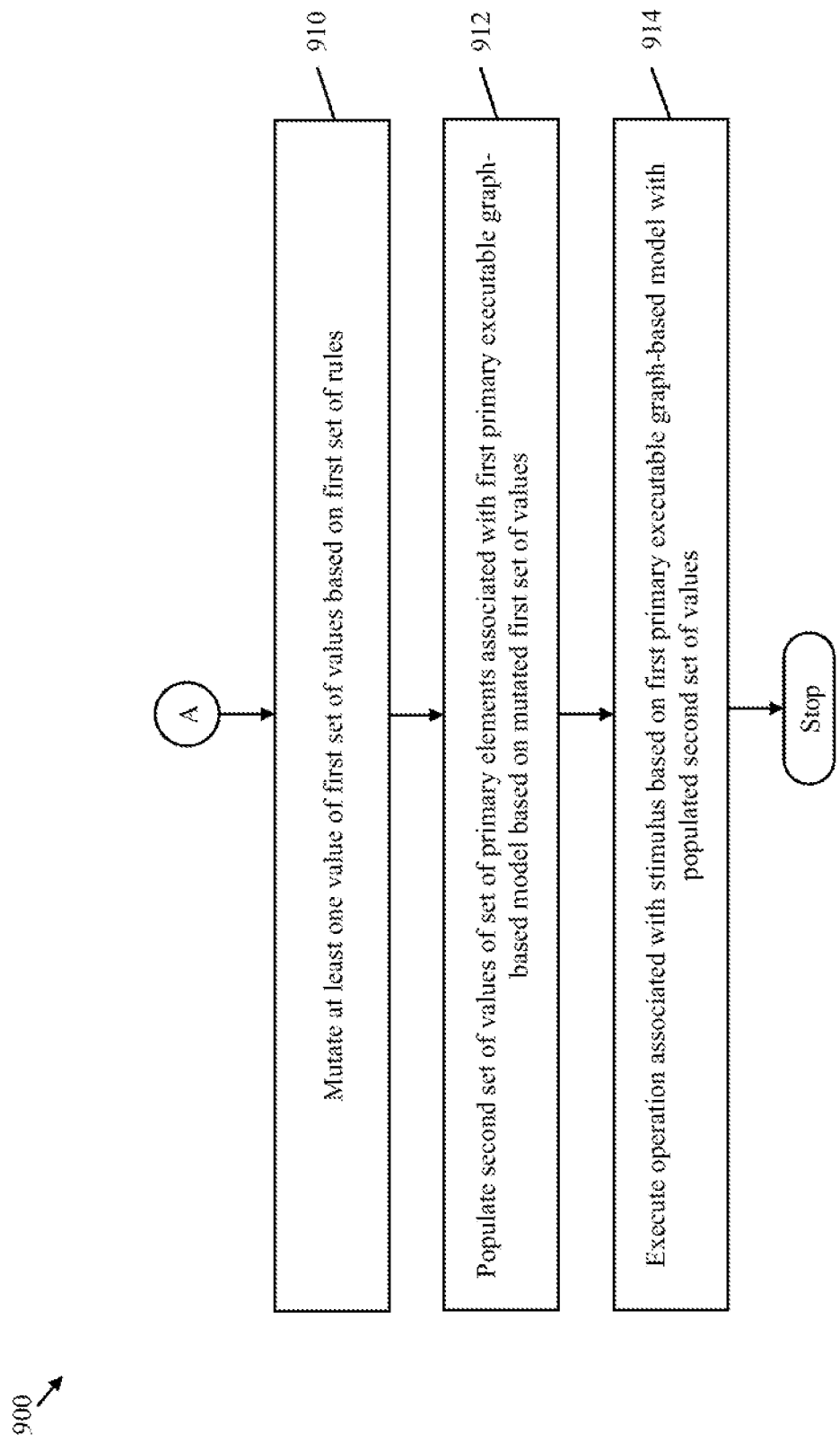

FIGS. 9A and 9B, collectively, represent a flowchart 900 that illustrates a method for facilitating in-situ ontology mapping in the overlay system 202, in accordance with an embodiment of the present disclosure. Referring to FIG. 9A, at 902, the processing circuitry of the overlay system 202 (e.g., the stimuli management module 212) receives a stimulus (e.g., the first stimulus) associated with the overlay system 202. Prior to receiving the stimulus, each primary executable graph-based model of the set of primary executable graph-based models associated with the overlay system 202 is mapped to one or more auxiliary executable graph-based models of the set of auxiliary executable graph-based models based on one or more set of rules associated with the overlay system 202. At 904, the processing circuitry (e.g., the stimuli management module 212 in conjunction with the controller module 206 and the ontology management module 222) identifies a first primary executable graph-based model from the set of primary executable graph-based models stored in the overlay system 202 for processing of the stimulus. In one embodiment, the set of primary executable graph-based models corresponds to the set of source executable graph-based models. In another embodiment, the set of primary executable graph-based models corresponds to the set of target executable graph-based models.

At 906, the processing circuitry (e.g., the ontology management module 222 in conjunction with the controller module 206) identifies a set of rules (e.g., the set of rules 640) based on a context of the stimulus such that, based on the set of rules, the first primary executable graph-based model is mapped to a first auxiliary executable graph-based model of the set of auxiliary executable graph-based models stored in the overlay system 202. In the embodiment where the set of primary executable graph-based models corresponds to the set of source executable graph-based models, the set of auxiliary executable graph-based models corresponds to the set of target executable graph-based models. Further, in the embodiment where the set of primary executable graph-based models corresponds to the set of target executable graph-based models, the set of auxiliary executable graph-based models corresponds to the set of source executable graph-based models.

At 908, the processing circuitry (e.g., the ontology management module 222 in conjunction with the controller module 206) retrieves a first set of values (e.g., the set of values 646) of the set of auxiliary elements (e.g., the set of target elements 636) associated with the first auxiliary executable graph-based model (e.g., the target executable graph-based model 606) from the first auxiliary executable graph-based model based on the set of rules.

Referring to FIG. 9B, at 910, the processing circuitry (e.g., the ontology management module 222 in conjunction with the controller module 206) mutates at least one value of the first set of values based on the first set of rules. At 912, the processing circuitry (e.g., the ontology management module 222 in conjunction with the controller module 206) populates a second set of values (e.g., the set of values 650) of a set of primary elements (e.g., the set of source elements 624) associated with the first primary executable graph-based model based on the mutated first set of values. In some embodiments, the second set of values may be populated based on the retrieved first set of values without mutating the retrieved first set of values. At 914, the processing circuitry (e.g., the ontology management module 222 in conjunction with the controller module 206) executes an operation associated with the stimulus based on the first primary executable graph-based model with the populated second set of values. Further, a response is generated by the processing circuitry based on the execution of the operation associated with the stimulus.

The disclosed embodiments encompass numerous advantages including an efficient and seamless approach for facilitation of in-situ ontology mapping in overlay systems. As the ontology mapping is in-situ, utilization of ontology mapping for stimulus processing in the overlay system 202 exhibits significantly reduced latency. Additionally, time complexity associated with stimulus processing is also reduced. Also, as data associated with primary executable graph-based models are retrieved and populated only when required for stimulus processing, memory utilization in the overlay system 202 is efficient. Additionally, as the ontology mapping is in-situ, any data associated with the overlay system 202 is secure and not vulnerable to third-party applications. Also, primary executable graph-based models and auxiliary executable graph-based models are loaded in the overlay system 202 as and when they are required. The systems and methods disclosed herein allow for the segregation of data and processing logic, and hence, ensure mutual independence thereof. Application areas of the systems and methods disclosed herein may include but are not limited to, industrial processes, robotics, home security, and the automation industry that stores different datasets associated with a single domain and requires interoperability between different datasets with high security and reduced latency.

Certain embodiments of the disclosure may be found in the disclosed systems, methods, and non-transitory computer-readable medium, for facilitating in-situ ontology mapping in overlay systems. The methods and systems disclosed herein include various operations performed by the processing circuitry (e.g., the controller module 206, the context module 210, the stimuli management module 212, the ontology management module 222, any other element of the overlay system 202, or a combination of two or more elements of the overlay system 202). The overlay system disclosed herein includes the storage circuitry configured to store a set of primary executable graph-based models and a set of auxiliary executable graph-based models, where each primary executable graph-based model is mapped to at least one auxiliary executable graph-based model based on one or more sets of rules associated with the overlay system. The overlay system further includes the processing circuitry that is coupled to the storage circuitry. The processing circuitry is configured to receive a first stimulus associated with the overlay system. The processing circuitry is further configured to identify, for processing of the first stimulus, a first primary executable graph-based model from the set of primary executable graph-based models. Further, the processing circuitry identifies, based on a first context of the first stimulus, a first set of rules based on which the first primary executable graph-based model is mapped to a first auxiliary executable graph-based model, of the set of auxiliary executable graph-based models. The first auxiliary executable graph-based model has a first set of auxiliary elements associated therewith. Further, the processing circuitry retrieves, from the first auxiliary executable graph-based model, a first set of values of the first set of auxiliary elements based on the first set of rules. The processing circuitry further populates, based on the retrieved first set of values and the first set of rules, a second set of values of a first set of primary elements associated with the first primary executable graph-based model. The processing circuitry further executes an operation associated with the first stimulus based on the first primary executable graph-based model with the populated second set of values.

In some embodiments, the processing circuitry is further configured to mutate, based on the first set of rules, at least one of the first set of values upon the retrieval thereof, thereby resulting in a mutated first set of values. The second set of values, that is populated, corresponds to the mutated first set of values.

In some embodiments, each auxiliary executable graph-based model, of the set of auxiliary executable graph-based models, comprises a set of auxiliary active nodes. Further, each primary executable graph-based model, of the set of primary executable graph-based models, comprises a set of primary active nodes. To map each primary executable graph-based model, of the set of primary executable graph-based models, to at least one auxiliary executable graph-based model, of the set of auxiliary executable graph-based models, at least one primary active node of the set of primary active nodes associated with the corresponding primary executable graph-based model is mapped to at least one auxiliary active node of the set of auxiliary active nodes associated with the corresponding auxiliary executable graph-based model.

In some embodiments, each primary executable graph-based model, of the set of primary executable graph-based models, further comprises one or more mapper overlay nodes, where each mapper overlay node is associated with one primary active node and comprises a set of rules that defines mapping for the corresponding primary active node. Further, the one or more mapper overlay nodes, of each primary executable graph-based model, are configured to facilitate, based on the respective one or more sets of rules, mapping of the corresponding primary executable graph-based model to at least one auxiliary executable graph-based model of the set of auxiliary executable graph-based models. Further, each mapper overlay node facilitates, based on the corresponding set of rules, mapping of the associated primary active node to at least one auxiliary active node of the set of auxiliary active nodes associated with the corresponding auxiliary executable graph-based model.

In some embodiments, each auxiliary executable graph-based model, of the set of auxiliary executable graph-based models, further comprises one or more mapper overlay nodes, where each mapper overlay node is associated with one auxiliary active node and comprises a set of rules that defines mapping for the corresponding auxiliary active node. Further, the one or more mapper overlay nodes, of each auxiliary executable graph-based model, are configured to facilitate, based on the respective one or more sets of rules, mapping of the corresponding auxiliary executable graph-based model to at least one primary executable graph-based model, of the set of primary executable graph-based models. Further, each mapper overlay node facilitates, based on the corresponding set of rules, mapping of the associated auxiliary active node to at least one primary active node of the set of primary active nodes associated with the corresponding primary executable graph-based model.

In some embodiments, at least one mapper overlay node, of the one or more mapper overlay nodes, is derived from at least one remaining mapper overlay node of the one or more mapper overlay nodes.

In some embodiments, the set of primary active nodes and the set of auxiliary active nodes, comprise at least one of a group consisting of: (i) a data node, (ii) a non-mapper overlay node, (iii) a node template that corresponds to a predefined node structure, and a node instance that corresponds to an implementation of the node template, and (iv) an edge node.

In some embodiments, at least one primary active node, of the set of primary active nodes, is derived from one or more remaining primary active nodes of the set of primary active nodes. Further, at least one auxiliary active node, of the set of auxiliary active nodes, is derived from one or more remaining auxiliary active nodes of the set of auxiliary active nodes.

In some embodiments, the first set of primary elements is associated with at least one of the set of primary active nodes associated with the first primary executable graph-based model, whereas the first set of auxiliary elements is associated with at least one of the set of auxiliary active nodes associated with the first auxiliary executable graph-based model. Further, each element, of the first set of primary elements and the first set of auxiliary elements, corresponds to one of a group consisting of an attribute, a label, an icon, and metadata of the corresponding active node.

In some embodiments, the first primary executable graph-based model corresponds to a first source executable graph-based model comprising a first source active node and a first mapper overlay node, and the first auxiliary executable graph-based model corresponds to a first target executable graph-based model comprising a first target active node. Thus, the first set of primary elements corresponds to a first set of source elements such that the first source active node comprises the first set of source elements and the first set of auxiliary elements corresponds to a first set of target elements. The first target executable graph-based model comprises a first target active node, whereas the first source executable graph-based model comprises a first source active node and a first mapper overlay node. Further, the first source active node comprises the first set of source elements, whereas the first target active node comprises the first set of target elements. The first mapper overlay node is associated with the first source active node and comprises the first set of rules, the processing circuitry is further configured to map, based on the first set of rules, the first source active node to the first target active node, thereby mapping the first source executable graph-based model to the first target executable graph-based model. To map the first source active node to the first target active node, the processing circuitry is further configured to retrieve, based on the first set of rules of the first mapper overlay node, a third set of values of the first set of source elements. The processing circuitry further populates a fourth set of values of the first set of target elements of the first target active node based on the retrieved third set of values and the first set of rules.

In some embodiments, the first set of values retrieved during the processing of the first stimulus corresponds to the fourth set of values populated during the mapping of the first source active node to the first target active node.

In some embodiments, the processing circuitry is further configured to delete the third set of values of the first set of source elements from the overlay system based on the population of the fourth set of values of the first set of target elements.

In some embodiments, the processing circuitry is further configured to mutate at least one of the third set of values upon the retrieval thereof, thereby resulting in a mutated third set of values. The fourth set of values, that is populated, corresponds to the mutated third set of values.

In some embodiments, the third set of values comprises a first value and a second value associated with a first source element and a second source element, of the first set of source elements, respectively, whereas the fourth set of values comprises a third value associated with a first target element of the first set of target elements. The third value is derived based on the first value, the second value, and the first set of rules.

In some embodiments, the set of primary executable graph-based models further comprises a second source executable graph-based model comprising, a second source active node and a second mapper overlay node associated with the second source active node. Further, the second source active node comprises a second set of source elements, and the second mapper overlay node comprises a second set of rules. The processing circuitry is further configured to map, based on the second set of rules, the second source active node to the first target active node, thereby mapping the second source executable graph-based model to the first target executable graph-based model. To map the second source active node to the first target active node, the processing circuitry is further configured to retrieve, based on the second set of rules of the second mapper overlay node, a fifth set of values of the second set of source elements. The processing circuitry further populates a sixth set of values of the first set of target elements of the first target active node based on the retrieved fifth set of values and the second set of rules.

In some embodiments, the processing circuitry is further configured to delete the fifth set of values of the second set of source elements from the overlay system based on the population of the sixth set of values.

In some embodiments, the processing circuitry is further configured to mutate at least one of the fifth set of values upon the retrieval thereof, thereby resulting in a mutated fifth set of values. The sixth set of values, that is populated, corresponds to the mutated fifth set of values.

In some embodiments, the first set of values retrieved during the processing of the first stimulus is derived based on at least one of a group consisting of (i) the fourth set of values populated during the mapping of the first source active node to the first target active node and (ii) the sixth set of values populated during the mapping of the second source active node to the first target active node.

In some embodiments, each value of the first set of values retrieved during the processing of the first stimulus comprises one of a group consisting of a corresponding value of the fourth set of values and a corresponding value of the sixth set of values. Further, each value of the first set of values retrieved during the processing of the first stimulus is defined based on the first set of rules and metadata, associated with the corresponding value, that is indicative of a source of the corresponding value.

In some embodiments, the first primary executable graph-based model corresponds to a first source executable graph-based model and the first auxiliary executable graph-based model corresponds to a first target executable graph-based model. Thus, the first set of primary elements corresponds to a first set of source elements and the first set of auxiliary elements corresponds to a first set of target elements. Further, the first target executable graph-based model comprises a first target active node and a second target active node, whereas the first source executable graph-based model comprises a first source active node, a second source active node, a first mapper overlay node, and a second mapper overlay node. The first mapper overlay node is associated with the first source active node and comprises one set of rules, whereas, the second mapper overlay node is associated with the second source active node and comprises another set of rules. The processing circuitry is further configured to map (i) the first source active node to the first target active node based on the set of rules of the first mapper overlay node, and (ii) the second source active node to the second target active node based on the set of rules of the second mapper overlay node. The mapping of the first source active node to the first target active node and the mapping of the second source active node to the second target active node corresponds to the mapping of the first source executable graph-based model to the first target executable graph-based model. When the first stimulus is received, the processing circuitry identifies at least one of a group consisting of (i) the set of rules of the first mapper overlay node and (ii) the set of rules of the second mapper overlay node as the first set of rules required for the processing of the first stimulus.

In some embodiments, the first primary executable graph-based model corresponds to a first target executable graph-based model and the first auxiliary executable graph-based model corresponds to a first source executable graph-based model. Thus, the first set of primary elements corresponds to a first set of target elements and the first set of auxiliary elements corresponds to a first set of source elements. Further, the first target executable graph-based model comprises a first target active node, whereas the first source executable graph-based model comprises a first source active node and a first mapper overlay node associated with the first source active node. Further, the first source active node comprises the first set of source elements, whereas the first target active node comprises the first set of target elements. The first mapper overlay node comprises the first set of rules, the processing circuitry is further configured to map, based on the first set of rules of the first mapper overlay node, the first source active node to the first target active node, thereby mapping the first source executable graph-based model to the first target executable graph-based model. To map the first source active node to the first target active node, the processing circuitry is further configured to retrieve, based on the first set of rules of the first mapper overlay node, the first set of source elements. The processing circuitry further populates metadata associated with the first target active node based on the retrieved first set of source elements. An identifier of the first source executable graph-based model and an identifier of the first source active node are associated with the first set of source elements that is populated in the metadata such that the processing circuitry identifies the first set of rules based on the metadata.

In some embodiments, prior to the execution of the operation associated with the first stimulus, the processing circuitry is further configured to load, in the overlay system, at least one of a group consisting of the first primary executable graph-based model and the first auxiliary executable graph-based model, with corresponding data and processing logic.

In some embodiments, each executable graph-based model, of the set of primary executable graph-based models and the set of auxiliary executable graph-based models, corresponds to a unique ontology. The mapping between the first primary executable graph-based model and the first auxiliary executable graph-based model corresponds to an ontology mapping therebetween.

In some embodiments, the first stimulus corresponds to one of a group consisting of a query and a command.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems and methods for facilitating in-situ ontology mapping in overlay systems. While various embodiments of the disclosed systems and methods have been described above, it should be understood that they have been presented for purposes of example only, and not limitations. It is not exhaustive and does not limit the present disclosure to the precise form disclosed. Modifications and variations are possible in light of the above teachings or may be acquired from practicing the present disclosure, without departing from the breadth or scope.

Moreover, for example, the present technology/system may achieve the following configurations:
1. An overlay system, comprising:
    a storage circuitry configured to store a set of primary executable graph-based models and a set of auxiliary executable graph-based models, where each primary executable graph-based model is mapped to at least one auxiliary executable graph-based model based on one or more sets of rules associated with the overlay system; and processing circuitry that is coupled to the storage circuitry, and configured to:
  receive a first stimulus associated with the overlay system;
  identify, for processing of the first stimulus, a first primary executable graph-based model from the set of primary executable graph-based models;
  identify, based on a first context of the first stimulus, a first set of rules based on which the first primary executable graph-based model is mapped to a first auxiliary executable graph-based model, of the set of auxiliary executable graph-based models, wherein the first auxiliary executable graph-based model has a first set of auxiliary elements associated therewith;
  retrieve, from the first auxiliary executable graph-based model, a first set of values of the first set of auxiliary elements based on the first set of rules;
  populate, based on the retrieved first set of values and the first set of rules, a second set of values of a first set of primary elements associated with the first primary executable graph-based model; and
  execute an operation associated with the first stimulus based on the first primary executable graph-based model with the populated second set of values.

2. The overlay system of 1, wherein the processing circuitry is further configured to mutate, based on the first set of rules, at least one of the first set of values upon the retrieval thereof, thereby resulting in a mutated first set of values, and wherein the second set of values, that is populated, corresponds to the mutated first set of values.

3. The overlay system of 1,
  wherein each auxiliary executable graph-based model, of the set of auxiliary executable graph-based models, comprises a set of auxiliary active nodes,
  wherein each primary executable graph-based model, of the set of primary executable graph-based models, comprises a set of primary active nodes, and
  wherein to map each primary executable graph-based model, of the set of primary executable graph-based models, to at least one auxiliary executable graph-based model, of the set of auxiliary executable graph-based models, at least one primary active node of the set of primary active nodes associated with the corresponding primary executable graph-based model is mapped to at least one auxiliary active node of the set of auxiliary active nodes associated with the corresponding auxiliary executable graph-based model.

4. The overlay system of 3,
  wherein each primary executable graph-based model, of the set of primary executable graph-based models, further comprises one or more mapper overlay nodes, where each mapper overlay node is associated with one primary active node and comprises a set of rules that defines mapping for the corresponding primary active node, and
  wherein the one or more mapper overlay nodes, of each primary executable graph-based model, are configured to facilitate, based on the respective one or more sets of rules, mapping of the corresponding primary executable graph-based model to at least one auxiliary executable graph-based model, of the set of auxiliary executable graph-based models, such that each mapper overlay node facilitates, based on the corresponding set of rules, mapping of the associated primary active node to at least one auxiliary active node of the set of auxiliary active nodes associated with the corresponding auxiliary executable graph-based model.

5. The overlay system of 4, wherein at least one mapper overlay node, of the one or more mapper overlay nodes, is derived from at least one remaining mapper overlay node of the one or more mapper overlay nodes.

6. The overlay system of 3,
  wherein each auxiliary executable graph-based model, of the set of auxiliary executable graph-based models, further comprises one or more mapper overlay nodes, where each mapper overlay node is associated with one auxiliary active node and comprises a set of rules that defines mapping for the corresponding auxiliary active node, and
  wherein the one or more mapper overlay nodes, of each auxiliary executable graph-based model, are configured to facilitate, based on the respective one or more sets of rules, mapping of the corresponding auxiliary executable graph-based model to at least one primary executable graph-based model, of the set of primary executable graph-based models, such that each mapper overlay node facilitates, based on the corresponding set of rules, mapping of the associated auxiliary active node to at least one primary active node of the set of primary active nodes associated with the corresponding primary executable graph-based model.

7. The overlay system of 6, wherein at least one mapper overlay node, of the one or more mapper overlay nodes, is derived from at least one remaining mapper overlay node of the one or more mapper overlay nodes.

8. The overlay system of 3, wherein the set of primary active nodes and the set of auxiliary active nodes, comprise at least one of a group consisting of:
  (i) a data node,
  (ii) a non-mapper overlay node,
  (iii) a node template that corresponds to a predefined node structure, and a node instance that corresponds to an implementation of the node template, and
  (iv) an edge node.

9. The overlay system of 3, wherein at least one primary active node, of the set of primary active nodes, is derived from one or more remaining primary active nodes of the set of primary active nodes, and wherein at least one auxiliary active node, of the set of auxiliary active nodes, is derived from one or more remaining auxiliary active nodes of the set of auxiliary active nodes.

10. The overlay system of 3,
  wherein the first set of primary elements is associated with at least one of a first set of primary active nodes associated with the first primary executable graph-based model, whereas the first set of auxiliary elements is associated with at least one of a first set of auxiliary active nodes associated with the first auxiliary executable graph-based model, and
  wherein each element, of the first set of primary elements and the first set of auxiliary elements, corresponds to one of a group consisting of an attribute, a label, an icon, and metadata of the corresponding active node.

11. The overlay system of 1,
    wherein the first primary executable graph-based model corresponds to a first source executable graph-based model comprising a first source active node and a first mapper overlay node, and the first auxiliary executable graph-based model corresponds to a first target executable graph-based model comprising a first target active node,
    wherein the first set of primary elements corresponds to a first set of source elements such that the first source active node comprises the first set of source elements and the first set of auxiliary elements corresponds to a first set of target elements such that the first target active node comprises the first set of target elements,
    wherein the first mapper overlay node is associated with the first source active node and comprises the first set of rules,
    wherein the processing circuitry is further configured to map, based on the first set of rules, the first source active node to the first target active node, thereby mapping the first source executable graph-based model to the first target executable graph-based model, and
    wherein to map the first source active node to the first target active node, the processing circuitry is further configured to:
        retrieve, based on the first set of rules of the first mapper overlay node, a third set of values of the first set of source elements; and
        populate a fourth set of values of the first set of target elements of the first target active node based on the retrieved third set of values and the first set of rules.
12. The overlay system of 11, wherein the first set of values retrieved during the processing of the first stimulus corresponds to the fourth set of values populated during the mapping of the first source active node to the first target active node.
13. The overlay system of 11, wherein the processing circuitry is further configured to delete the third set of values of the first set of source elements from the overlay system based on the population of the fourth set of values of the first set of target elements.
14. The overlay system of 11, wherein the processing circuitry is further configured to mutate at least one of the third set of values upon the retrieval thereof, thereby resulting in a mutated third set of values, and wherein the fourth set of values, that is populated, corresponds to the mutated third set of values.
15. The overlay system of 11,
    wherein the third set of values comprises a first value and a second value associated with a first source element and a second source element, of the first set of source elements, respectively, whereas the fourth set of values comprises a third value associated with a first target element of the first set of target elements, and
    wherein the third value is derived based on the first value, the second value, and the first set of rules.
16. The overlay system of 11,
    wherein the set of primary executable graph-based models further comprises a second source executable graph-based model comprising a second source active node and a second mapper overlay node associated with the second source active node,
    wherein the second source active node comprises a second set of source elements, and the second mapper overlay node comprises a second set of rules,
    wherein the processing circuitry is further configured to map, based on the second set of rules, the second source active node to the first target active node, thereby mapping the second source executable graph-based model to the first target executable graph-based model, and
    wherein to map the second source active node to the first target active node, the processing circuitry is further configured to:
        retrieve, based on the second set of rules of the second mapper overlay node, a fifth set of values of the second set of source elements; and
        populate a sixth set of values of the first set of target elements of the first target active node based on the retrieved fifth set of values and the second set of rules.
17. The overlay system of 16, wherein the processing circuitry is further configured to delete the fifth set of values of the second set of source elements from the overlay system based on the population of the sixth set of values.
18. The overlay system of 16, wherein the processing circuitry is further configured to mutate at least one of the fifth set of values upon the retrieval thereof, thereby resulting in a mutated fifth set of values, and wherein the sixth set of values, that is populated, corresponds to the mutated fifth set of values.
19. The overlay system of 11, wherein the first set of values retrieved during the processing of the first stimulus is derived based on at least one of a group consisting of (i) the fourth set of values populated during the mapping of the first source active node to the first target active node and (ii) the sixth set of values populated during the mapping of the second source active node to the first target active node.
20. The overlay system of 11,
    wherein each value of the first set of values retrieved during the processing of the first stimulus comprises one of a group consisting of a corresponding value of the fourth set of values and a corresponding value of the sixth set of values, and
    wherein each value of the first set of values retrieved during the processing of the first stimulus is defined based on the first set of rules and metadata, associated with the corresponding value, that is indicative of a source of the corresponding value.
21. The overlay system of 1,
    wherein the first primary executable graph-based model corresponds to a first source executable graph-based model and the first auxiliary executable graph-based model corresponds to a first target executable graph-based model,
    wherein the first target executable graph-based model comprises a first target active node and a second target active node, whereas the first source executable graph-based model comprises a first source active node, a second source active node, a first mapper overlay node, and a second mapper overlay node,
    wherein the first mapper overlay node is associated with the first source active node and comprises one set of rules, whereas, the second mapper overlay node is associated with the second source active node and comprises another set of rules, wherein the processing circuitry is further configured to map (i) the first source active node to the first target active node based on the set of rules of the first mapper overlay node, and (ii) the second source active node to the second target active node based on the set of rules of the second mapper overlay node, wherein the mapping of the first source active node to the first target active node and the mapping of the second source active node to the second target active node corresponds to the mapping of the first source executable graph-based model to the first target executable graph-based model, and wherein when the first stimulus is received, the processing circuitry identifies at least one of a group consisting of (i) the set of rules of the first mapper overlay node and (ii) the set of rules of the second mapper overlay node as the first set of rules required for the processing of the first stimulus.

22. The overlay system of 1, wherein the first primary executable graph-based model corresponds to a first target executable graph-based model comprising a first target active node and the first auxiliary executable graph-based model corresponds to a first source executable graph-based model comprising a first source active node and a first mapper overlay node associated with the first source active node, wherein the first set of primary elements corresponds to a first set of target elements such that the first target active node comprises the first set of target elements, whereas the first set of auxiliary elements corresponds to a first set of source elements such that the first source active node comprises the first set of source elements, wherein the first mapper overlay node comprises the first set of rules, wherein the processing circuitry is further configured to map, based on the first set of rules, the first source active node to the first target active node, thereby mapping the first source executable graph-based model to the first target executable graph-based model, and wherein to map the first source active node to the first target active node, the processing circuitry is further configured to:

retrieve, based on the first set of rules of the first mapper overlay node, the first set of source elements; and populate metadata associated with the first target active node based on the retrieved first set of source elements, wherein an identifier of the first source executable graph-based model and an identifier of the first source active node are associated with the first set of source elements that is populated in the metadata, and wherein the processing circuitry identifies the first set of rules based on the metadata.

23. The overlay system of 1, wherein prior to the execution of the operation associated with the first stimulus, the processing circuitry is further configured to load, in the overlay system, at least one of a group consisting of the first primary executable graph-based model and the first auxiliary executable graph-based model, with corresponding data and processing logic.

24. The overlay system of 1, wherein each executable graph-based model, of the set of primary executable graph-based models and the set of auxiliary executable graph-based models, corresponds to a unique ontology, and wherein the mapping between the first primary executable graph-based model and the first auxiliary executable graph-based model corresponds to an ontology mapping therebetween.

25. The overlay system of 1, wherein the first stimulus corresponds to one of a group consisting of a query and a command.

26. A method, comprising:

receiving, by processing circuitry of an overlay system, a first stimulus associated with the overlay system, wherein a set of primary executable graph-based models and a set of auxiliary executable graph-based models are stored in a storage circuitry of the overlay system, where each primary executable graph-based model is mapped to at least one auxiliary executable graph-based model based on one or more sets of rules associated with the overlay system;

identifying, by the processing circuitry, for processing of the first stimulus, a first primary executable graph-based model from the set of primary executable graph-based models;

identifying, by the processing circuitry, based on a first context of the first stimulus, a first set of rules based on which the first primary executable graph-based model is mapped to a first auxiliary executable graph-based model, of the set of auxiliary executable graph-based models, wherein the first auxiliary executable graph-based model has a first set of auxiliary elements associated therewith;

retrieving, by the processing circuitry, from the first auxiliary executable graph-based model, a first set of values of the first set of auxiliary elements based on the first set of rules;

populating, by the processing circuitry, based on the retrieved first set of values and the first set of rules, a second set of values of a first set of primary elements associated with the first primary executable graph-based model; and executing, by the processing circuitry, an operation associated with the first stimulus based on the first primary executable graph-based model with the populated second set of values.

What is claimed is:

1. An overlay system, comprising:

storage circuitry configured to store a set of primary executable graph-based models and a set of auxiliary executable graph-based models, where each primary executable graph-based model is mapped to at least one auxiliary executable graph-based model based on one or more sets of rules associated with the overlay system; and processing circuitry that is coupled to the storage circuitry, and configured to:

receive a first stimulus associated with the overlay system;

identify, for processing of the first stimulus, a first primary executable graph-based model from the set of primary executable graph-based models;

identify, based on a first context of the first stimulus, a first set of rules based on which the first primary executable graph-based model is mapped to a first auxiliary executable graph-based model, of the set of auxiliary executable graph-based models, wherein the first auxiliary executable graph-based model has a first set of auxiliary elements associated therewith;

retrieve, from the first auxiliary executable graph-based model, a first set of values of the first set of auxiliary elements based on the first set of rules;

populate, based on the retrieved first set of values and the first set of rules, a second set of values of a first set of primary elements associated with the first primary executable graph-based model; and execute an operation associated with the first stimulus based on the first primary executable graph-based model with the populated second set of values.

2. The overlay system of claim 1, wherein the processing circuitry is further configured to mutate, based on the first set of rules, at least one of the first set of values upon the retrieval thereof, thereby resulting in a mutated first set of values, and wherein the second set of values, that is populated, corresponds to the mutated first set of values.

3. The overlay system of claim 1,
wherein each auxiliary executable graph-based model, of the set of auxiliary executable graph-based models, comprises a set of auxiliary active nodes,
wherein each primary executable graph-based model, of the set of primary executable graph-based models, comprises a set of primary active nodes, and
wherein to map each primary executable graph-based model, of the set of primary executable graph-based models, to at least one auxiliary executable graph-based model, of the set of auxiliary executable graph-based models, at least one primary active node of the set of primary active nodes associated with the corresponding primary executable graph-based model is mapped to at least one auxiliary active node of the set of auxiliary active nodes associated with the corresponding auxiliary executable graph-based model.

4. The overlay system of claim 3,
wherein each primary executable graph-based model, of the set of primary executable graph-based models, further comprises one or more mapper overlay nodes, where each mapper overlay node is associated with one primary active node and comprises a set of rules that defines mapping for the corresponding primary active node, and
wherein the one or more mapper overlay nodes, of each primary executable graph-based model, are configured to facilitate, based on the respective one or more sets of rules, mapping of the corresponding primary executable graph-based model to at least one auxiliary executable graph-based model, of the set of auxiliary executable graph-based models, such that each mapper overlay node facilitates, based on the corresponding set of rules, mapping of the associated primary active node to at least one auxiliary active node of the set of auxiliary active nodes associated with the corresponding auxiliary executable graph-based model.

5. The overlay system of claim 3,
wherein each auxiliary executable graph-based model, of the set of auxiliary executable graph-based models, further comprises one or more mapper overlay nodes, where each mapper overlay node is associated with one auxiliary active node and comprises a set of rules that defines mapping for the corresponding auxiliary active node, and
wherein the one or more mapper overlay nodes, of each auxiliary executable graph-based model, are configured to facilitate, based on the respective one or more sets of rules, mapping of the corresponding auxiliary executable graph-based model to at least one primary executable graph-based model, of the set of primary executable graph-based models, such that each mapper overlay node facilitates, based on the corresponding set of rules, mapping of the associated auxiliary active node to at least one primary active node of the set of primary active nodes associated with the corresponding primary executable graph-based model.

6. The overlay system of claim 5, wherein at least one mapper overlay node, of the one or more mapper overlay nodes, is derived from at least one remaining mapper overlay node of the one or more mapper overlay nodes.

7. The overlay system of claim 3, wherein the set of primary active nodes and the set of auxiliary active nodes comprise at least one of a group consisting of:
   (i) a data node,
   (ii) a non-mapper overlay node,
   (iii) a node template that corresponds to a predefined node structure,
and a node instance that corresponds to an implementation of the node template, and
   (iv) an edge node.

8. The overlay system of claim 3,
wherein the first set of primary elements is associated with at least one of a first set of primary active nodes associated with the first primary executable graph-based model, whereas the first set of auxiliary elements is associated with at least one of a first set of auxiliary active nodes associated with the first auxiliary executable graph-based model, and
wherein each element, of the first set of primary elements and the first set of auxiliary elements, corresponds to one of a group consisting of an attribute, a label, an icon, and metadata of the corresponding active node.

9. The overlay system of claim 1,
wherein the first primary executable graph-based model corresponds to a first source executable graph-based model comprising a first source active node and a first mapper overlay node, and the first auxiliary executable graph-based model corresponds to a first target executable graph-based model comprising a first target active node,
wherein the first set of primary elements corresponds to a first set of source elements such that the first source active node comprises the first set of source elements, and the first set of auxiliary elements corresponds to a first set of target elements such that the first target active node comprises the first set of target elements,
wherein the first mapper overlay node is associated with the first source active node and comprises the first set of rules,
wherein the processing circuitry is further configured to map, based on the first set of rules, the first source active node to the first target active node, thereby mapping the first source executable graph-based model to the first target executable graph-based model, and
wherein to map the first source active node to the first target active node, the processing circuitry is further configured to:
retrieve, based on the first set of rules of the first mapper overlay node, a third set of values of the first set of source elements; and
populate a fourth set of values of the first set of target elements of the first target active node based on the retrieved third set of values and the first set of rules.

10. The overlay system of claim 9, wherein the first set of values retrieved during the processing of the first stimulus corresponds to the fourth set of values populated during the mapping of the first source active node to the first target active node.

11. The overlay system of claim 9, wherein the processing circuitry is further configured to delete the third set of values of the first set of source elements from the overlay system based on the population of the fourth set of values of the first set of target elements.

12. The overlay system of claim 9, wherein the processing circuitry is further configured to mutate at least one of the third set of values upon the retrieval thereof, thereby resulting in a mutated third set of values, and wherein the fourth set of values, that is populated, corresponds to the mutated third set of values.

13. The overlay system of claim 9,
wherein the third set of values comprises a first value and a second value associated with a first source element and a second source element, of the first set of source elements, respectively, whereas the fourth set of values comprises a third value associated with a first target element of the first set of target elements, and
wherein the third value is derived based on the first value, the second value, and the first set of rules.

14. The overlay system of claim 9,
wherein the set of primary executable graph-based models further comprises a second source executable graph-based model comprising a second source active node and a second mapper overlay node associated with the second source active node,
wherein the second source active node comprises a second set of source elements, and the second mapper overlay node comprises a second set of rules,
wherein the processing circuitry is further configured to map, based on the second set of rules, the second source active node to the first target active node, thereby mapping the second source executable graph-based model to the first target executable graph-based model, and
wherein to map the second source active node to the first target active node, the processing circuitry is further configured to:
retrieve, based on the second set of rules of the second mapper overlay node, a fifth set of values of the second set of source elements; and
populate a sixth set of values of the first set of target elements of the first target active node based on the retrieved fifth set of values and the second set of rules.

15. The overlay system of claim 9, wherein the first set of values retrieved during the processing of the first stimulus is derived based on at least one of a group consisting of (i) the fourth set of values populated during the mapping of the first source active node to the first target active node and (ii) the sixth set of values populated during the mapping of the second source active node to the first target active node.

16. The overlay system of claim 9,
wherein each value of the first set of values retrieved during the processing of the first stimulus comprises one of a group consisting of a corresponding value of the fourth set of values and a corresponding value of the sixth set of values, and
wherein each value of the first set of values retrieved during the processing of the first stimulus is defined based on the first set of rules and metadata, associated with the corresponding value, that is indicative of a source of the corresponding value.

17. The overlay system of claim 1,
wherein the first primary executable graph-based model corresponds to a first source executable graph-based model and the first auxiliary executable graph-based model corresponds to a first target executable graph-based model,
wherein the first target executable graph-based model comprises a first target active node and a second target active node, whereas the first source executable graph-based model comprises a first source active node, a second source active node, a first mapper overlay node, and a second mapper overlay node,
wherein the first mapper overlay node is associated with the first source active node and comprises one set of rules, whereas, the second mapper overlay node is associated with the second source active node and comprises another set of rules,
wherein the processing circuitry is further configured to map (i) the first source active node to the first target active node based on the set of rules of the first mapper overlay node, and (ii) the second source active node to the second target active node based on the set of rules of the second mapper overlay node,
wherein the mapping of the first source active node to the first target active node and the mapping of the second source active node to the second target active node corresponds to the mapping of the first source executable graph-based model to the first target executable graph-based model, and
wherein when the first stimulus is received, the processing circuitry identifies at least one of a group consisting of (i) the set of rules of the first mapper overlay node and (ii) the set of rules of the second mapper overlay node as the first set of rules required for the processing of the first stimulus.

18. The overlay system of claim 1,
wherein the first primary executable graph-based model corresponds to a first target executable graph-based model comprising a first target active node, and the first auxiliary executable graph-based model corresponds to a first source executable graph-based model comprising a first source active node and a first mapper overlay node associated with the first source active node,
wherein the first set of primary elements corresponds to a first set of target elements such that the first target active node comprises the first set of target elements, whereas the first set of auxiliary elements corresponds to a first set of source elements such that the first source active node comprises the first set of source elements,
wherein the first mapper overlay node comprises the first set of rules,
wherein the processing circuitry is further configured to map, based on the first set of rules, the first source active node to the first target active node, thereby mapping the first source executable graph-based model to the first target executable graph-based model, and
wherein to map the first source active node to the first target active node, the processing circuitry is further configured to:
retrieve, based on the first set of rules of the first mapper overlay node, the first set of source elements; and
populate metadata associated with the first target active node based on the retrieved first set of source elements, wherein an identifier of the first source executable graph-based model and an identifier of the first source active node are associated with the first set of source elements that is populated in the metadata, and wherein the processing circuitry identifies the first set of rules based on the metadata.

19. The overlay system of claim 1, wherein each executable graph-based model, of the set of primary executable graph-based models and the set of auxiliary executable graph-based models, corresponds to a unique ontology, and wherein the mapping between the first primary executable graph-based model and the first auxiliary executable graph-based model corresponds to an ontology mapping therebetween.

20. A method, comprising:

receiving, by processing circuitry of an overlay system, a first stimulus associated with the overlay system, wherein a set of primary executable graph-based models and a set of auxiliary executable graph-based models are stored in storage circuitry of the overlay system, where each primary executable graph-based model is mapped to at least one auxiliary executable graph-based model based on one or more sets of rules associated with the overlay system;

identifying, by the processing circuitry, for processing of the first stimulus, a first primary executable graph-based model from the set of primary executable graph-based models;

identifying, by the processing circuitry, based on a first context of the first stimulus, a first set of rules based on which the first primary executable graph-based model is mapped to a first auxiliary executable graph-based model, of the set of auxiliary executable graph-based models, wherein the first auxiliary executable graph-based model has a first set of auxiliary elements associated therewith;

retrieving, by the processing circuitry, from the first auxiliary executable graph-based model, a first set of values of the first set of auxiliary elements based on the first set of rules;

populating, by the processing circuitry, based on the retrieved first set of values and the first set of rules, a second set of values of a first set of primary elements associated with the first primary executable graph-based model; and executing, by the processing circuitry, an operation associated with the first stimulus based on the first primary executable graph-based model with the populated second set of values.

* * * * *